United States Patent
Sondag et al.

(10) Patent No.: US 12,223,318 B2
(45) Date of Patent: Feb. 11, 2025

(54) APPARATUS AND METHOD FOR MANAGING UNSUPPORTED INSTRUCTION SET ARCHITECTURE (ISA) FEATURES IN A VIRTUALIZED ENVIRONMENT

(71) Applicant: Intel Corporation, Santa Clara, CA (US)

(72) Inventors: Tyler Sondag, Beaverton, OR (US); David Sheffield, Portland, OR (US); Sofia Pediaditaki, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 17/214,572

(22) Filed: Mar. 26, 2021

(65) Prior Publication Data

US 2022/0308867 A1    Sep. 29, 2022

(51) Int. Cl.
*G06F 9/30* (2018.01)
*G06F 9/22* (2006.01)
*G06F 9/455* (2018.01)

(52) U.S. Cl.
CPC .......... *G06F 9/223* (2013.01); *G06F 9/30174* (2013.01); *G06F 9/455* (2013.01); *G06F 9/45558* (2013.01)

(58) Field of Classification Search
CPC ...... G06F 9/223; G06F 9/30174; G06F 9/455; G06F 9/45558
See application file for complete search history.

(56) References Cited

U.S. PATENT DOCUMENTS 9,182,990 B1 * 11/2015 Tallam .................... G06F 9/455
9,229,881 B2 * 1/2016 Epstein ................ G06F 12/145

(Continued)

OTHER PUBLICATIONS

International Preliminary Report on Patentability, PCT App. No. PCT/US2022/021770, Oct. 5, 2023, 5 pages.

(Continued)

*Primary Examiner* — Corey S Faherty
(74) *Attorney, Agent, or Firm* — Nicholson De Vos Webster & Elliott LLP

(57) ABSTRACT

An apparatus and method for supporting deprecated instructions. For example, one embodiment of a processor comprises: A processor comprising: a plurality of cores, each core comprising a current microarchitecture to execute instructions and process data, the current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture; at least one core of the plurality of cores comprising: a decoder to decode the instructions, the decoder to specify one or more microoperations corresponding to each of the instructions; execution circuitry to execute the corresponding microoperations; wherein either a first type or a second type of virtual machine exit is to be performed responsive to detecting a deprecated instruction in a first virtual machine, wherein responsive to the first type of virtual machine exit, the hypervisor is to perform a first emulation of the prior microarchitecture without reliance on the partial hardware support, and wherein responsive to the second type of virtual machine exit, the hypervisor is to perform a second emulation of the prior microarchitecture relying on the partial hardware support.

24 Claims, 27 Drawing Sheets

(56) References Cited

U.S. PATENT DOCUMENTS

| | | |
|---|---|---|
| 9,405,551 B2 | 8/2016 | Yamada et al. |
| 9,672,354 B2 * | 6/2017 | Lutas ................. G06F 12/1027 |
| 10,204,220 B1 | 2/2019 | Koryakin et al. |
| 10,268,595 B1 | 4/2019 | Bonzini et al. |
| 10,949,207 B2 | 3/2021 | Opferman et al. |
| 11,106,481 B2 * | 8/2021 | Tsirkin ................ G06F 9/45558 |
| 2019/0196939 A1 | 6/2019 | Lengauer et al. |
| 2023/0376411 A1 * | 11/2023 | Quinn ................. G06F 12/1009 |

OTHER PUBLICATIONS

International Search Report and Written Opinion, PCT App. No. PCT/US2022/021770, Jul. 7, 2022, 8 pages.

\* cited by examiner

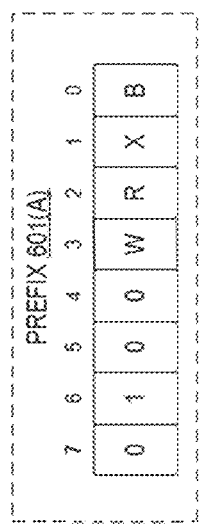
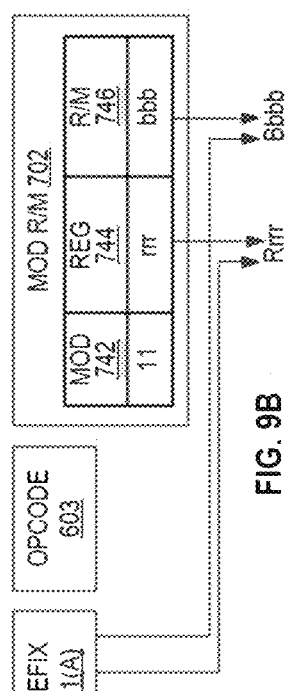
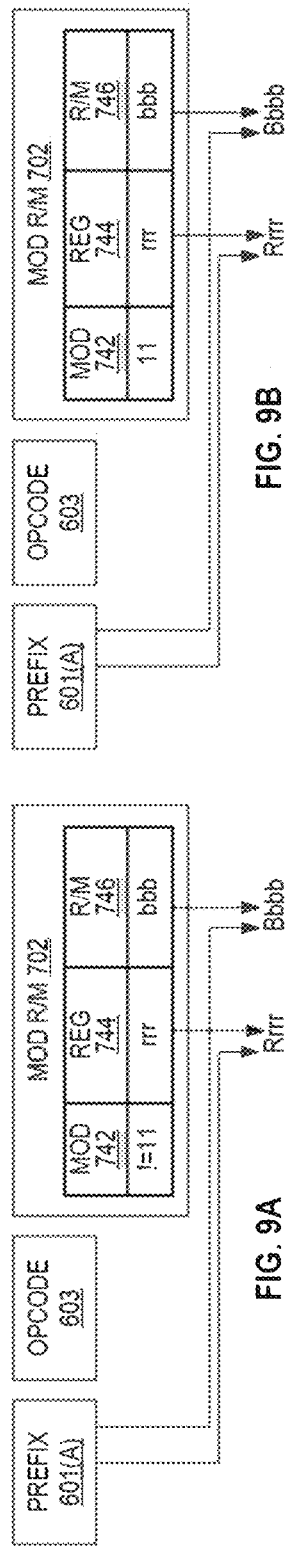
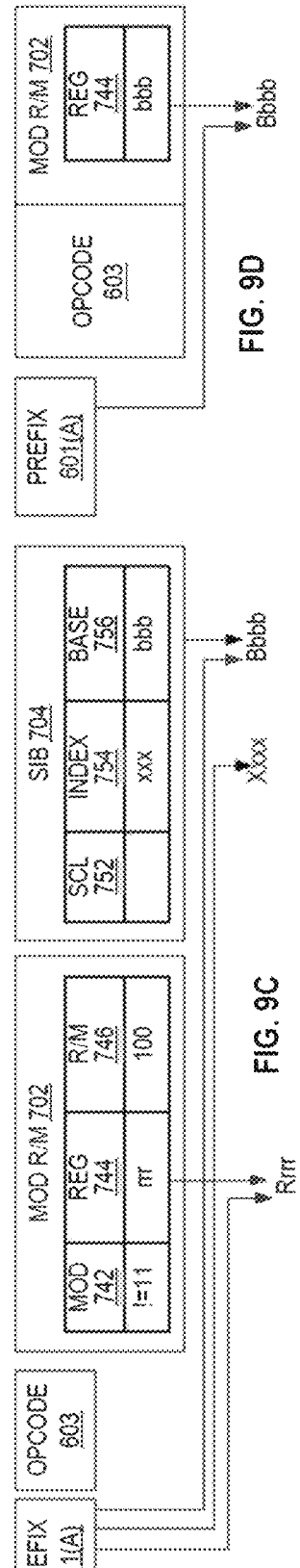
FIG. 8
FIG. 9A
FIG. 9B
FIG. 9C
FIG. 9D

| Instruction | Windows 10 Boot | Linux Boot | Solaris Boot | DaCapo avrova (solaris) | Speedometer (windows, chrome) |
|---|---|---|---|---|---|
| IRET | 0.01265 | 0.01273 | 0.10041 | 0.04647 | 0.01767 |
| CLTS | - | - | 0.02367 | 0.02064 | - |
| LGDT | 4.6e-9 | 1.6e-7 | 7.0e-7 | - | - |
| LIDT | 2.3e-7 | 7.8e-8 | 7.2e-7 | - | 1.7e-7 |
| LLDT | 4.6e-9 | 2.6e-8 | 2.3e-8 | - | - |
| LMSW | - | - | - | - | - |
| SMSW | - | - | - | - | - |
| LTR | 2.3e-9 | 2.6e-8 | 3.6e-7 | - | - |
| SWAPGS | 0.09678 | 0.06716 | 0.51367 | 0.36611 | 0.09121 |
| SLDT | 9.3e-9 | - | - | - | 1.4e-9 |
| STR | 7.0e-9 | 2.6e-8 | 3.4e-7 | - | 1.4e-9 |
| LCALL | - | - | - | - | - |
| LJMP | 0.00318 | - | - | - | 0.00367 |
| VERR | - | - | - | - | - |
| VERW* | 0.02512 | - | - | - | 0.03083 |
| SGDT | 2.1e-8 | - | 3.6e-7 | - | 2.8e-9 |
| ARPL | - | - | - | - | - |
| LAR | - | - | - | - | - |
| LDS | - | - | - | - | - |
| LSS | - | - | - | - | - |
| LES | - | - | - | - | - |
| LFS | - | - | - | - | - |
| LGS | - | - | - | - | - |
| LSL | 0.00332 | - | - | - | - |

| | Windows 10 Boot | Linux Boot | Solaris Boot | DaCapo avrova (solaris) | Speedometer (windows, chrome) |
|---|---|---|---|---|---|
| MOV to SS | 0.00319 | 0.00319 | 5.2e-8 | 3.6e-7 | - | 0.00367 |
| MOV to DS | 3.1e-5 | 1.4e-5 | 0.01741 | 0.02830 | 5.9e-7 |
| MOV to ES | 2.8e-5 | 1.4e-5 | 0.01741 | 0.02830 | 5.9e-7 |
| MOV to FS | 0.00731 | 0.00159 | 0.01741 | 0.02830 | 0.01407 |
| MOV to GS | 3.1e-5 | 4.9e-5 | 0.01741 | 0.02830 | 5.9e-5 |
| MOV from CS | 0.00058 | 0.00160 | 4.7e-6 | 5.1e-8 | 0.00069 |
| MOV from SS | 0.00058 | 0.00160 | 4.7e-6 | 5.1e-8 | 0.00069 |
| MOV from DS | 0.00786 | 0.00660 | 0.07381 | 0.06811 | 0.01471 |
| MOV from ES | 0.00786 | 0.00660 | 0.07381 | 0.06811 | 0.01471 |
| MOV from FS | 0.00058 | 0.00660 | 0.07381 | 0.06811 | 0.00069 |
| MOV from GS | 0.00786 | 0.00660 | 0.07381 | 0.06811 | 0.01471 |
| PUSH CS | - | - | - | - | - |
| PUSH DS | - | - | - | - | - |
| PUSH ES | - | - | - | - | - |
| PUSH FS | - | - | - | - | - |
| PUSH GS | - | - | - | - | - |
| PUSH SS | - | - | - | - | - |
| POP DS | - | - | - | - | - |
| POP ES | - | - | - | - | - |
| POP FS | - | - | - | - | - |
| POP GS | - | - | - | - | - |
| POP SS | - | - | - | - | - |
| SYSENTER | - | - | 0.00936 | 0.00257 | - |
| SYSEXIT | - | - | - | - | - |

FIG. 15

| Transition Operation 1610 | CS | RIP | SS | RSP | RFLAGS | RCX | R11 | Stack |
|---|---|---|---|---|---|---|---|---|
| | | | Ring 0-to-Ring 3 1601 | | | | | |
| SYSCALL | IA32_STAR[47:32] | IA32_LSTAR | IA32_STAR[47:32]+8 | - | Masked by FMASK, clear RF | RIP | RFLAGS | - |
| SYSENTER | IA32_SYSENTER_CS[7:0] Force base/limit to flat + other hard-coding | IA32_SYSENTER_EIP | IA32_SYSENTER_CS[15:8] Force base/limit to flat + other hard-coding | IA32_SYSENTER_ESP | Clears VM, IF | - | - | - |
| CALL-GATE | gate-descriptor | gate-descriptor | Null/0 | TSS | - | - | - | SS:RSP, CS:RIP |
| Exceptions, interrupts, etc. | gate-descriptor | gate-descriptor | Null/0 | TSS[DPL] | Clears TF,NT,RF Conditionally clear IF | - | - | SS:RSP, RFLAGS, CS, RIP, maybe error code |

FIG. 16A

Ring 3-to-Ring 0 1602

| Return Operation 1611 | CS | RIP | SS | RSP | RFLAGS | ES/FS/GS/DS | NMI blocking |
|---|---|---|---|---|---|---|---|
| IRET | popped | popped | popped | popped | popped + various changes | zeroed if non-conforming or SEG.DPL<CPL | Unblock |
| RET (far) | popped | popped | popped | popped | | zeroed if non-conforming or SEG.DPL<CPL | |
| SYSRET | IA32_STAR[63:48]+16. Base=0, Limit=inf, CPL/RPL forced to 3, etc | RCX | IA32_STAR[63:48]+8 | | 0*32+ R11[31:0] | | |
| SYSEXIT | IA32_SYSENTER_CS[23:16] Force base/limit to flat + other hard-coding (cached, not GDT/LDT copy) | RDX | IA32_SYSENTER_CS[31:24] Force base/limit to flat + other hard-coding (cached, not GDT/LDT copy) | RCX | RF=0 | | |

FIG. 16B

```c
/* 64 bit interrupt */
static void do_interrupt64(CPUX86State *env, int intno, int is_int,
                           int error_code, target_ulong next_eip, int is_hw)
{
    SegmentCache
    *dt;target_ulong
    ptr;
    int type, dpl, selector, cpl,
    ist;int has_error_code,
    new_stack; uint32_t e1, e2, e3,
    ss;
    target_ulong old_eip, esp,
    offset;uint32_t cs_limit;

bool got_exit =
    false;has_error_code
    = 0; env-
    >int_count++;
    if (!is_int && !is_hw) {
        has_error_code = exception_has_error_code(intno);
    }
    if (is_int) {
        old_eip = next_eip;
    } else {
        old_eip = env->eip;
    }

/* For legacy virtualization, VMCS needs to track IDTR, LDTR, and TR
    */dt = &env->idt;
    if (intno * 16 + 15 > dt->limit) {
        /* exit condition 0 */
        env-
        >int_exit_cases[0]++;
        raise_exception_err(env, EXCP0D_GPF, intno * 16 + 2);
    }
    /* These are just 4-byte loads
    */ptr = dt->base + intno * 16;
    e1 = cpu_ldl_kernel(env, ptr);
    e2 = cpu_ldl_kernel(env, ptr +
    4);e3 = cpu_ldl_kernel(env, ptr +
    8);
    /* check gate type */
    type = (e2 >> DESC_TYPE_SHIFT) & 0x1f;
    switch (type) {
    case 14: /* 386 interrupt gate
    */case 15: /* 386 trap gate */
        break;
    default:
        /* exit condition 1 */
        env-
        >int_exit_cases[1]++;
        raise_exception_err(env, EXCP0D_GPF, intno * 16 + 2);
        break;
    }
    dpl = (e2 >> DESC_DPL_SHIFT) & 3;
    cpl = env->hflags & HF_CPL_MASK;
    /* check privilege if software int
    */if (is_int && dpl < cpl) {
        /* exit condition 2 */
        env-
        >int_exit_cases[2]++;
        raise_exception_err(env, EXCP0D_GPF, intno * 16 + 2);
    }
    /* check valid bit */
    if (!(e2 & DESC_P_MASK)) {
        /* exit condition 3 */
        env-
        >int_exit_cases[3]++;
        raise_exception_err(env, EXCP0B_NOSEG, intno * 16 + 2);
```

FIG. 18A

```
}
selector = e1 >> 16;
offset = ((target_ulong)e3 << 32) | (e2 & 0xffff0000) | (e1 &
0x0000ffff);ist = e2 & 7;
if ((selector & 0xfffc) == 0) {
    /* exit condition 4 */
    env-
    >int_exit_cases[4]++;
    raise_exception_err(env, EXCP0D_GPF, 0);
} if (load_segment(env, &e1, &e2, selector) != 0) {
    /* exit condition 5 */
    env-
    >int_exit_cases[5]++;
    raise_exception_err(env, EXCP0D_GPF, selector & 0xfffc);
}
if (!(e2 & DESC_S_MASK) || !(e2 & (DESC_CS_MASK))) {
    /* exit condition 6 */
    env-
    >int_exit_cases[6]++;
    raise_exception_err(env, EXCP0D_GPF, selector & 0xfffc);
}
dpl = (e2 >> DESC_DPL_SHIFT) & 3;
if (dpl > cpl) {
    /* exit condition 7 */
    env-
    >int_exit_cases[7]++;
    raise_exception_err(env, EXCP0D_GPF, selector & 0xfffc);
}
if (!(e2 & DESC_P_MASK)) {
    /* exit condition 8 */
    env-
    >int_exit_cases[8]++;
    raise_exception_err(env, EXCP0B_NOSEG, selector & 0xfffc);
}
if (!(e2 & DESC_L_MASK) || (e2 & DESC_B_MASK)) {
    /* exit condition 9 */
    env-
    >int_exit_cases[9]++;
    raise_exception_err(env, EXCP0D_GPF, selector & 0xfffc);
}
if (e2 & DESC_C_MASK)
    {dpl = cpl;
}
if (dpl < cpl || ist != 0) {
    /* to inner privilege */
    X86CPU *cpu =
    env_archcpu(env);int index,
    level;
    level = ist != 0 ? ist + 3:
    dpl;new_stack = 1;
    if (!(env->tr.flags & DESC_P_MASK)) {
        cpu_abort(CPU(cpu), "invalid
        tss");
    }
    index = 8 * level + 4;
    /* TR needs to remain in the VMCS
    */if ((index + 7) > env->tr.limit)
    {
        /* exit conditions 10 and 11 */
        env->int_exit_cases[(ist!=0) ? 11 : 10]++;
```

FIG. 18B

```
        env->int_exit_cases[(ist!=0) ? 11 : 10]++; raise_excep-
        tion_err(env, EXCP0A_TSS, env->tr.selector & 0xfffc);
    }
    /* Generic 8-byte load */
    esp = cpu_ldq_kernel(env, env->tr.base + in-
    dex); ss = 0;
}
else {
    /* to same privilege */
    if (env->eflags & VM_MASK) {
        /* exit conditions 12 */ env-
        >int_exit_cases[12]++;
        raise_exception_err(env, EXCP0D_GPF, selector & 0xfffc);
    }
    new_stack = 0;
    esp = env->regs[R_ESP];
}
esp &= ~0xfLL; /* align stack */

/* Selector values need to be saved in the VMCS */
PUSHQ(esp, env->segs[R_SS].selector);
PUSHQ(esp, env->regs[R_ESP]);
PUSHQ(esp, cpu_compute_eflags(env));
PUSHQ(esp, env->segs[R_CS].selector);
PUSHQ(esp, old_eip);
if (has_error_code) {
    PUSHQ(esp, error_code);
}

/* interrupt gate clear IF mask */ if
((type & 1) == 0) {
    env->eflags &= ~IF_MASK;
}
env->eflags &= ~(TF_MASK | VM_MASK | RF_MASK | NT_MASK);

if (new_stack) { ss = 0
    | dpl;
    /* populate segment SS with predefined values
    * base = 0
    * limit = 0
    * flags = dpl
    * QEMU uses cpu_x86_load_seg_cache to update it's simulator
    state */ cpu_x86_load_seg_cache(env, R_SS, ss, 0, 0, dpl <<
    DESC_DPL_SHIFT);
}
env->regs[R_ESP] = esp;

cs_limit = get_seg_limit(e1,e2);

/* Non-zero CS base */
if(!got_exit && (get_seg_base(e1,e2) != 0)) {
    got_exit = true;
    /* exit conditions 13 */ env-
    >int_exit_cases[13]++;
} if(!got_exit) {
    switch(cs_limit)
    {
        /* Windows 10 */ case
        0x0:
```

FIG. 18C

```
        /* Linux */ case
    0xffffffff:
        break; default:
        got_exit = true;
        /* exit conditions 14 */ env-
        >int_exit_cases[14]++; break;
    }
}
```

FIG. 18D

```
    selector = (selector & ~3) | dpl;
    cpu_x86_load_seg_cache(env, R_CS, selector,
                get_seg_base(e1, e2),
                get_seg_limit(e1, e2), e2);
    env->eip = offset;
}
```

```
IRET implementation

// Called in long-mode
void helper_iret_protected(CPUX86State *env, int shift, int next_eip)
{
    int tss_selector, type;
    uint32_t e1, e2;
    env->iret_count++;

/* specific case for TSS */
    if (env->eflags & NT_MASK) {
#ifdef TARGET_X86_64
        if (env->hflags & HF_LMA_MASK) {
            raise_exception_err_ra(env, EXCP0D_GPF, 0, GETPC());
        }
#endif
        tss_selector = cpu_lduw_kernel_ra(env, env->tr.base + 0, GETPC());
        if (tss_selector & 4) {
            raise_exception_err_ra(env, EXCP0A_TSS, tss_selector & 0xfffc, GETPC());
        }
        if (load_segment_ra(env, &e1, &e2, tss_selector, GETPC()) != 0) {
            raise_exception_err_ra(env, EXCP0A_TSS, tss_selector & 0xfffc, GETPC());
        }
        type = (e2 >> DESC_TYPE_SHIFT) & 0x17;
        /* NOTE: we check both segment and busy TSS */
        if (type != 3) {
            raise_exception_err_ra(env, EXCP0A_TSS, tss_selector & 0xfffc, GETPC());
        }
        switch_tss_ra(env, tss_selector, e1, e2, SWITCH_TSS_IRET, next_eip, GETPC());
    } else {
        helper_ret_protected(env, shift, 1, 0, GETPC());
    }
    env->hflags2 &= ~HF2_NMI_MASK;
}

/* protected mode iret */
static inline void helper_ret_protected(CPUX86State *env, int shift,
                                         int is_iret, int addend,
                                         uintptr_t retaddr)
{
    uint32_t new_cs, new_eflags, new_ss;
    uint32_t new_es, new_ds, new_fs, new_gs;
    uint32_t e1, e2, ss_e1, ss_e2;
    int cpl, dpl, rpl, eflags_mask, iopl;
    target_ulong ssp, sp, new_eip, new_esp, sp_mask;
```

FIG. 18E

```
#ifdef TARGET_X86_64
    if (shift == 2) {
        sp_mask = -1;
    } else
#endif
    {
        sp_mask = get_sp_mask(env->segs[R_SS].flags);
    }
    sp = env->regs[R_ESP];
    ssp = env->segs[R_SS].base;
    new_eflags = 0; /* avoid warning */
#ifdef TARGET_X86_64
    if (shift == 2) {
        POPQ_RA(sp, new_eip, retaddr);
        POPQ_RA(sp, new_cs, retaddr);
        new_cs &= 0xffff;
        if (is_iret) {
            POPQ_RA(sp, new_eflags, retaddr);
        }
    } else
#endif
    {
        if (shift == 1) {
            /* 32 bits */
            POPL_RA(ssp, sp, sp_mask, new_eip, retaddr);
            POPL_RA(ssp, sp, sp_mask, new_cs, retaddr);
            new_cs &= 0xffff;
            if (is_iret) {
                /* exit condition 0 */
                env->iret_exit_cases[0]++;
                POPL_RA(ssp, sp, sp_mask, new_eflags, retaddr);
                if (new_eflags & VM_MASK) {
                    goto return_to_vm86;
                }
            }
        } else {
            /* 16 bits */
            POPW_RA(ssp, sp, sp_mask, new_eip, retaddr);
            POPW_RA(ssp, sp, sp_mask, new_cs, retaddr);
            if (is_iret) {
                /* exit condition 1 */
                env->iret_exit_cases[1]++;
                POPW_RA(ssp, sp, sp_mask, new_eflags, retaddr);
            }
        }
    }
    LOG_PCALL("lret new %04x:" TARGET_FMT_lx " s=%d addend=0x%x\n",
              new_cs, new_eip, shift, addend);
    LOG_PCALL_STATE(env_cpu(env));
    if ((new_cs & 0xfffc) == 0) {
        /* exit condition 2 */
        env->iret_exit_cases[2]++;
        raise_exception_err_ra(env, EXCP0D_GPF, new_cs & 0xfffc, retaddr);
    }
    if (load_segment_ra(env, &e1, &e2, new_cs, retaddr) != 0) {
        /* exit condition 3 */
        env->iret_exit_cases[3]++;
        raise_exception_err_ra(env, EXCP0D_GPF, new_cs & 0xfffc, retaddr);
```

FIG. 18F

```
    }
    if (!(e2 & DESC_S_MASK) ||
        !(e2 & DESC_CS_MASK)) {
        /* exit condition 4 */
        env->iret_exit_cases[4]++;
        raise_exception_err_ra(env, EXCP0D_GPF, new_cs & 0xfffc, retaddr);
    }
    cpl = env->hflags & HF_CPL_MASK;
    rpl = new_cs & 3;
    if (rpl < cpl) {
        /* exit condition 5 */
        env->iret_exit_cases[5]++;
        raise_exception_err_ra(env, EXCP0D_GPF, new_cs & 0xfffc, retaddr);
    }
    dpl = (e2 >> DESC_DPL_SHIFT) & 3;
    if (e2 & DESC_C_MASK) {
        if (dpl > rpl) {
            /* exit condition 6 */
            env->iret_exit_cases[6]++;
            raise_exception_err_ra(env, EXCP0D_GPF, new_cs & 0xfffc, retaddr);
        }
    } else {
        if (dpl != rpl) {
            /* exit condition 7 */
            env->iret_exit_cases[7]++;
            raise_exception_err_ra(env, EXCP0D_GPF, new_cs & 0xfffc, retaddr);
        }
    }
    if (!(e2 & DESC_P_MASK)) {
        /* exit condition 8 */
        env->iret_exit_cases[8]++;
        raise_exception_err_ra(env, EXCP0B_NOSEG, new_cs & 0xfffc, retaddr);
    } sp += addend;
    if (rpl == cpl && (!(env->hflags & HF_CS64_MASK) ||
                       ((env->hflags & HF_CS64_MASK) && !is_iret))) {
        /* return to same privilege level */
        cpu_x86_load_seg_cache(env, R_CS, new_cs,
                    get_seg_base(e1, e2),
                    get_seg_limit(e1, e2),
                    e2);
    } else {
        /* return to different privilege level */
#ifdef TARGET_X86_64
        if (shift == 2) {
            POPQ_RA(sp, new_esp, retaddr);
            POPQ_RA(sp, new_ss, retaddr);
            new_ss &= 0xffff;
        } else
#endif
        {
            if (shift == 1) {
                /* 32 bits */
                POPL_RA(ssp, sp, sp_mask, new_esp, retaddr);
                POPL_RA(ssp, sp, sp_mask, new_ss, retaddr);
                new_ss &= 0xffff;
            } else {
                /* exit condition 9 */
```

FIG. 18G

```c
            env->iret_exit_cases[9]++;
            /* 16 bits */
            POPW_RA(ssp, sp, sp_mask, new_esp, retaddr);
            POPW_RA(ssp, sp, sp_mask, new_ss, retaddr);
        }
    }
    LOG_PCALL("new ss:esp=%04x:" TARGET_FMT_lx "\n",
              new_ss, new_esp);
    if ((new_ss & 0xfffc) == 0) {
#ifdef TARGET_X86_64
        /* NULL ss is allowed in long mode if cpl != 3 */
        /* XXX: test CS64? */
        if ((env->hflags & HF_LMA_MASK) && rpl != 3) {
            cpu_x86_load_seg_cache(env, R_SS, new_ss,
                                   0, 0xffffffff,
                                   DESC_G_MASK | DESC_B_MASK | DESC_P_MASK |
                                   DESC_S_MASK | (rpl << DESC_DPL_SHIFT) |
                                   DESC_W_MASK | DESC_A_MASK);
            ss_e2 = DESC_B_MASK; /* XXX: should not be needed? */
        } else
#endif
        {
            /* exit condition 10 */
            env->iret_exit_cases[10]++;
            raise_exception_err_ra(env, EXCP0D_GPF, 0, retaddr);
        }
    } else {
        if ((new_ss & 3) != rpl) {
            /* exit condition 11 */
            env->iret_exit_cases[11]++;
            raise_exception_err_ra(env, EXCP0D_GPF, new_ss & 0xfffc, retaddr);
        }
        if (load_segment_ra(env, &ss_e1, &ss_e2, new_ss, retaddr) != 0) {
            /* exit condition 12 */
            env->iret_exit_cases[12]++;
            raise_exception_err_ra(env, EXCP0D_GPF, new_ss & 0xfffc, retaddr);
        }
        if (!(ss_e2 & DESC_S_MASK) ||
            (ss_e2 & DESC_CS_MASK) ||
            !(ss_e2 & DESC_W_MASK)) {
            /* exit condition 13 */
            env->iret_exit_cases[13]++;
            raise_exception_err_ra(env, EXCP0D_GPF, new_ss & 0xfffc, retaddr);
        }
        dpl = (ss_e2 >> DESC_DPL_SHIFT) & 3;
        if (dpl != rpl) {
            /* exit condition 14 */
            env->iret_exit_cases[14]++;
            raise_exception_err_ra(env, EXCP0D_GPF, new_ss & 0xfffc, retaddr);
        }
        if (!(ss_e2 & DESC_P_MASK)) {
            /* exit condition 15 */
            env->iret_exit_cases[15]++;
            raise_exception_err_ra(env, EXCP0B_NOSEG, new_ss & 0xfffc, retaddr);
        }
        cpu_x86_load_seg_cache(env, R_SS, new_ss,
                               get_seg_base(ss_e1, ss_e2),
                               get_seg_limit(ss_e1, ss_e2),
                               ss_e2);
```

FIG. 18H

```
        }
        cpu_x86_load_seg_cache(env, R_CS, new_cs,
                    get_seg_base(e1, e2),
                    get_seg_limit(e1, e2),
                    e2);
        sp = new_esp;
#ifdef TARGET_X86_64
        if (env->hflags & HF_CS64_MASK) {
            sp_mask = -1;
        } else
#endif
        {
            sp_mask = get_sp_mask(ss_e2);
        }

/* validate data segments */
        validate_seg(env, R_ES, rpl);
        validate_seg(env, R_DS, rpl);
        validate_seg(env, R_FS, rpl);
        validate_seg(env, R_GS, rpl);

sp += addend;
    }
    SET_ESP(sp, sp_mask);
    env->eip = new_eip;
    if (is_iret) {
        /* NOTE: 'cpl' is the _old_ CPL */
        eflags_mask = TF_MASK | AC_MASK | ID_MASK | RF_MASK | NT_MASK;
        if (cpl == 0) {
            eflags_mask |= IOPL_MASK;
        }
        iopl = (env->eflags >> IOPL_SHIFT) & 3;
        if (cpl <= iopl) {
            eflags_mask |= IF_MASK;
        }
        if (shift == 0) {
            eflags_mask &= 0xffff;
        }
        cpu_load_eflags(env, new_eflags, eflags_mask);
    }
    return;

return_to_vm86:
    POPL_RA(ssp, sp, sp_mask, new_esp, retaddr);
    POPL_RA(ssp, sp, sp_mask, new_ss, retaddr);
    POPL_RA(ssp, sp, sp_mask, new_es, retaddr);
    POPL_RA(ssp, sp, sp_mask, new_ds, retaddr);
    POPL_RA(ssp, sp, sp_mask, new_fs, retaddr);
    POPL_RA(ssp, sp, sp_mask, new_gs, retaddr);

/* modify processor state */
    cpu_load_eflags(env, new_eflags, TF_MASK | AC_MASK | ID_MASK |
                    IF_MASK | IOPL_MASK | VM_MASK | NT_MASK | VIF_MASK |
                    VIP_MASK);
    load_seg_vm(env, R_CS, new_cs & 0xffff);
    load_seg_vm(env, R_SS, new_ss & 0xffff);
    load_seg_vm(env, R_ES, new_es & 0xffff);
    load_seg_vm(env, R_DS, new_ds & 0xffff);
    load_seg_vm(env, R_FS, new_fs & 0xffff);
    load_seg_vm(env, R_GS, new_gs & 0xffff);

env->eip = new_eip & 0xffff;
    env->regs[R_ESP] = new_esp;
}
```

FIG. 18I

APPARATUS AND METHOD FOR MANAGING UNSUPPORTED INSTRUCTION SET ARCHITECTURE (ISA) FEATURES IN A VIRTUALIZED ENVIRONMENT

BACKGROUND

Field of the Invention

The embodiments of the invention relate generally to the field of computer processors. More particularly, the embodiments relate to an apparatus and method for managing unsupported/deprecated features of an instruction set architecture (ISA) in a virtualized environment.

Description of the Related Art

Deprecating ISA features is desirable for a variety of reasons including, but not limited to, reducing attack surfaces, simplifying the validation space, and reducing implementation efforts. However, existing software will no longer work on a new instruction set architecture (ISA) if the software uses these deprecated features. Thus, deprecating ISA features can be a challenging task.

BRIEF DESCRIPTION OF THE DRAWINGS

A better understanding of the present invention can be obtained from the following detailed description in conjunction with the following drawings, in which:

A better understanding of the present invention can be obtained from the following detailed description in conjunction with the following drawings, in which:

FIG. 8 illustrates one embodiment of an instruction prefix;

FIGS. 9A-D illustrate embodiments of how the R, X, and B fields of the prefix are used;

FIG. 15 illustrates timing data related to the execution of certain instructions within an instruction set architecture;

FIG. 16A illustrates operations associated with transitioning between a lower privilege level and a higher privilege level;

FIG. 16B illustrates operations associated with transitioning between a higher privilege level lower privilege level and a higher privilege level.

FIGS. 18A-I illustrate program code in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
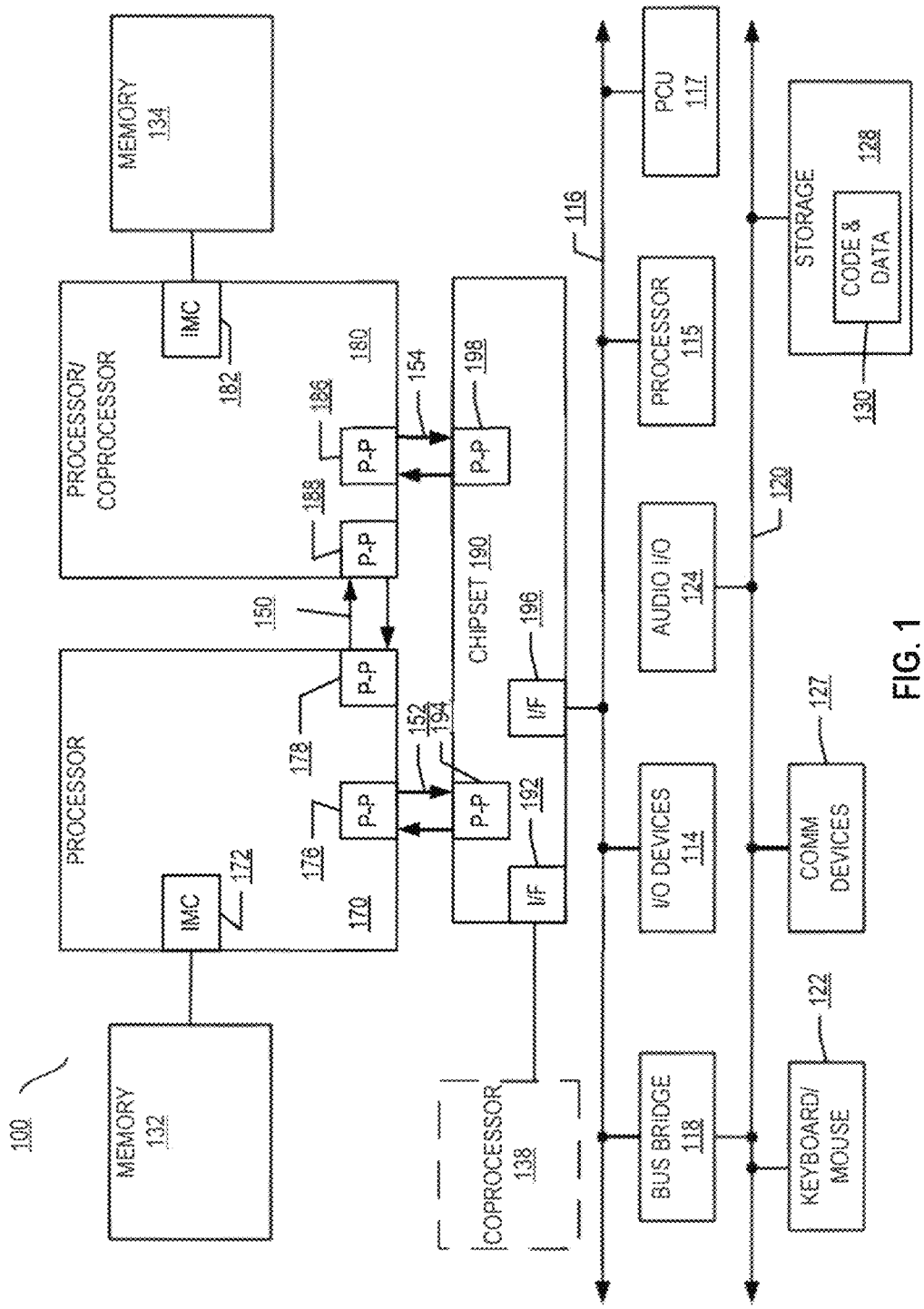
FIG. 1 illustrates an example computer system architecture.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic conFIG.d to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 2:
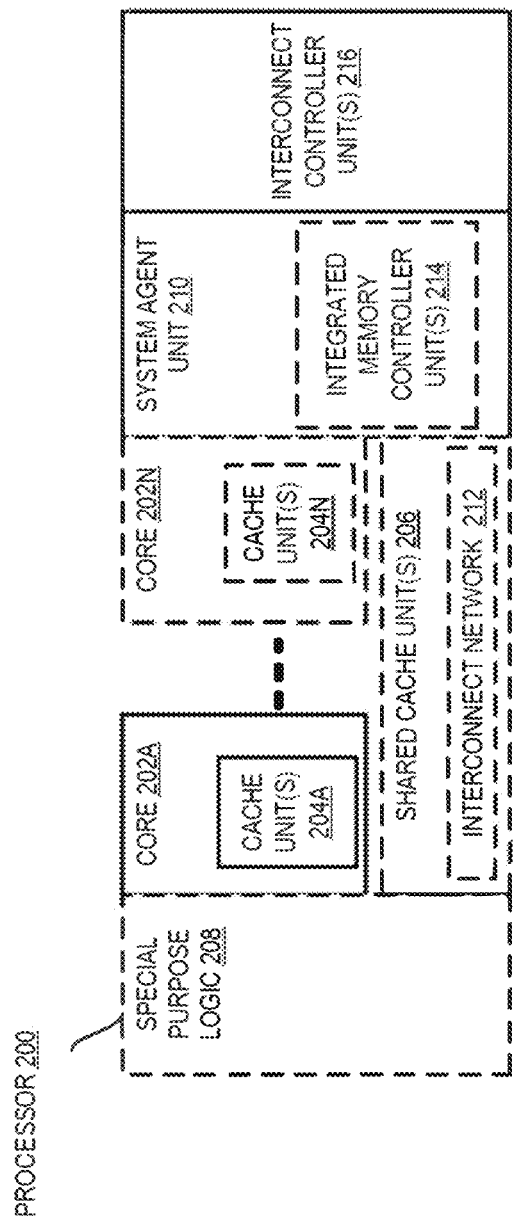
FIG. 2 illustrates a processor comprising a plurality of cores.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures

In-Order and Out-of-Order Core Block Diagram

Figure 3A:
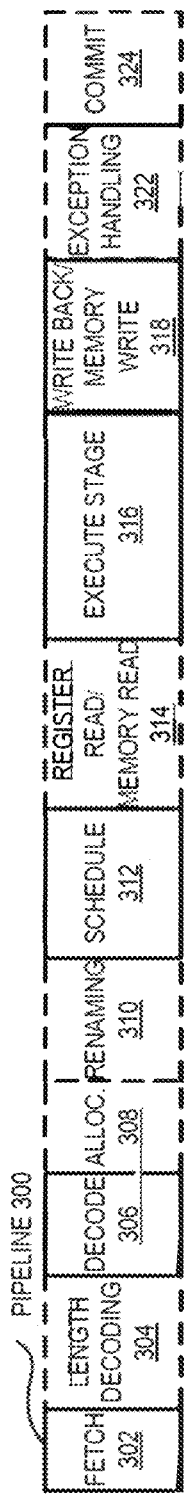
FIG. 3A illustrates a plurality of stages of a processing pipeline.
Figure 3B:
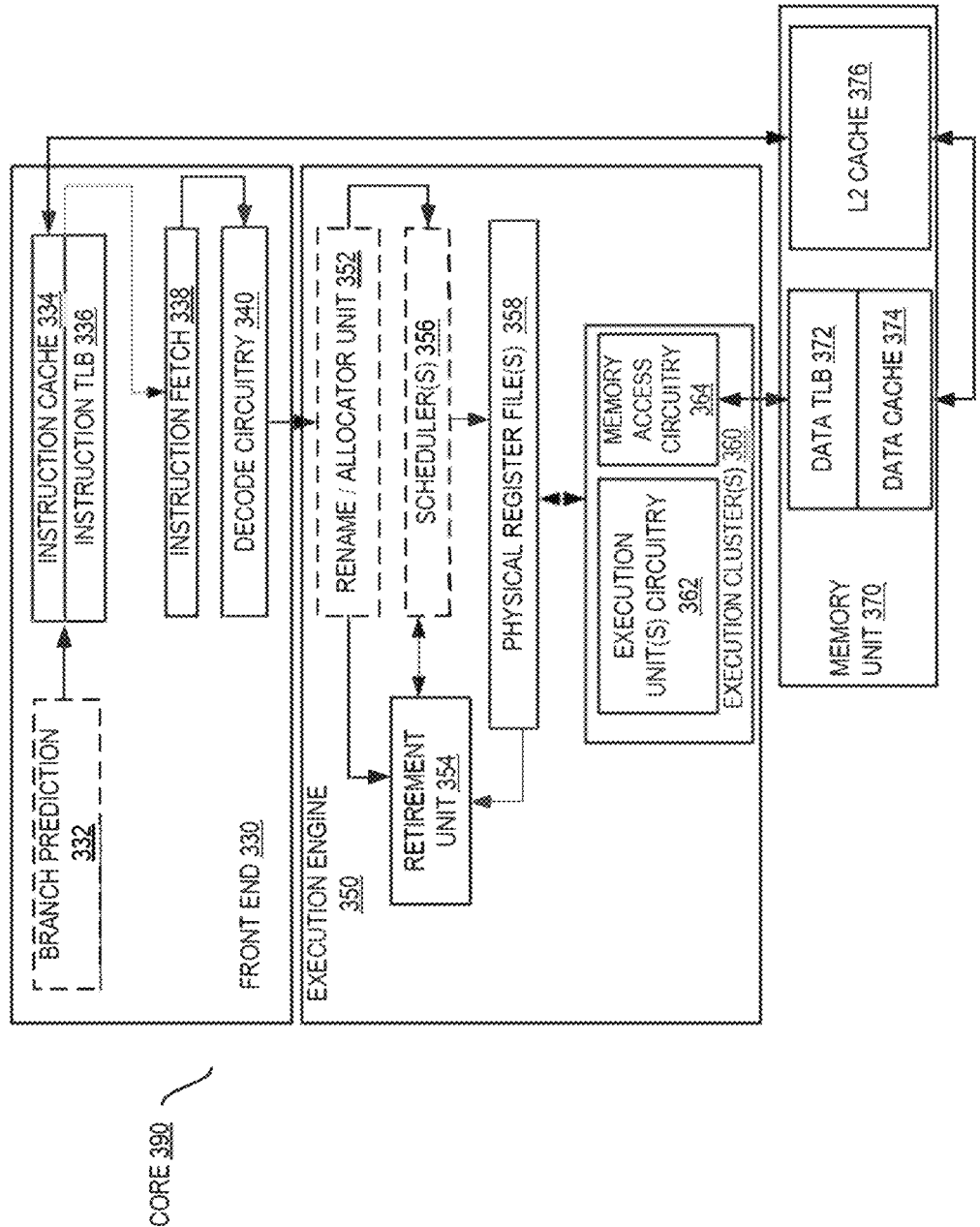
FIG. 3B illustrates details of one embodiment of a core.

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

Figure 4:
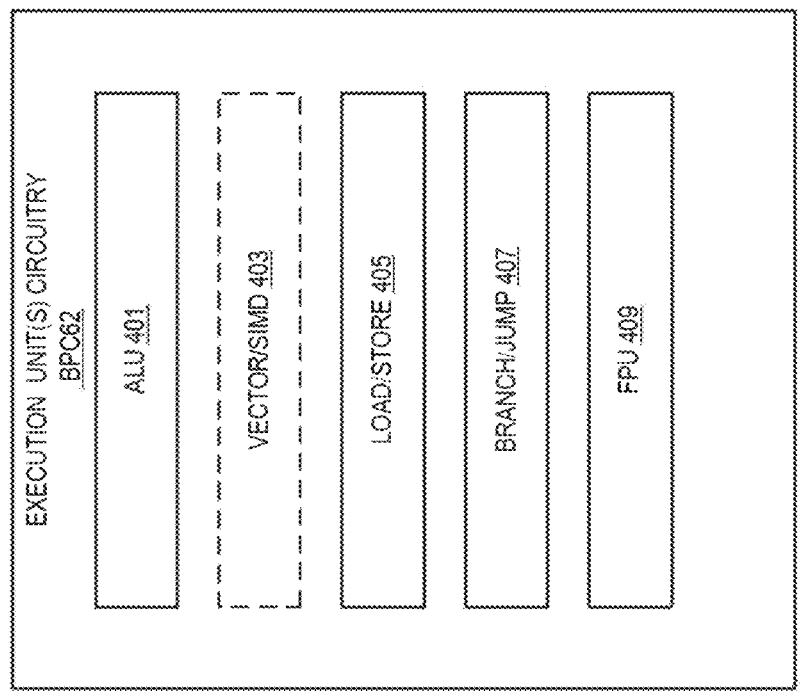
FIG. 4 illustrates execution circuitry in accordance with one embodiment.

FIG. 4 illustrates embodiments of execution unit(s) circuitry, such as execution unit(s) circuitry 362 of FIG. 3(B). As illustrated, execution unit(s) circuitry 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU) circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 5:
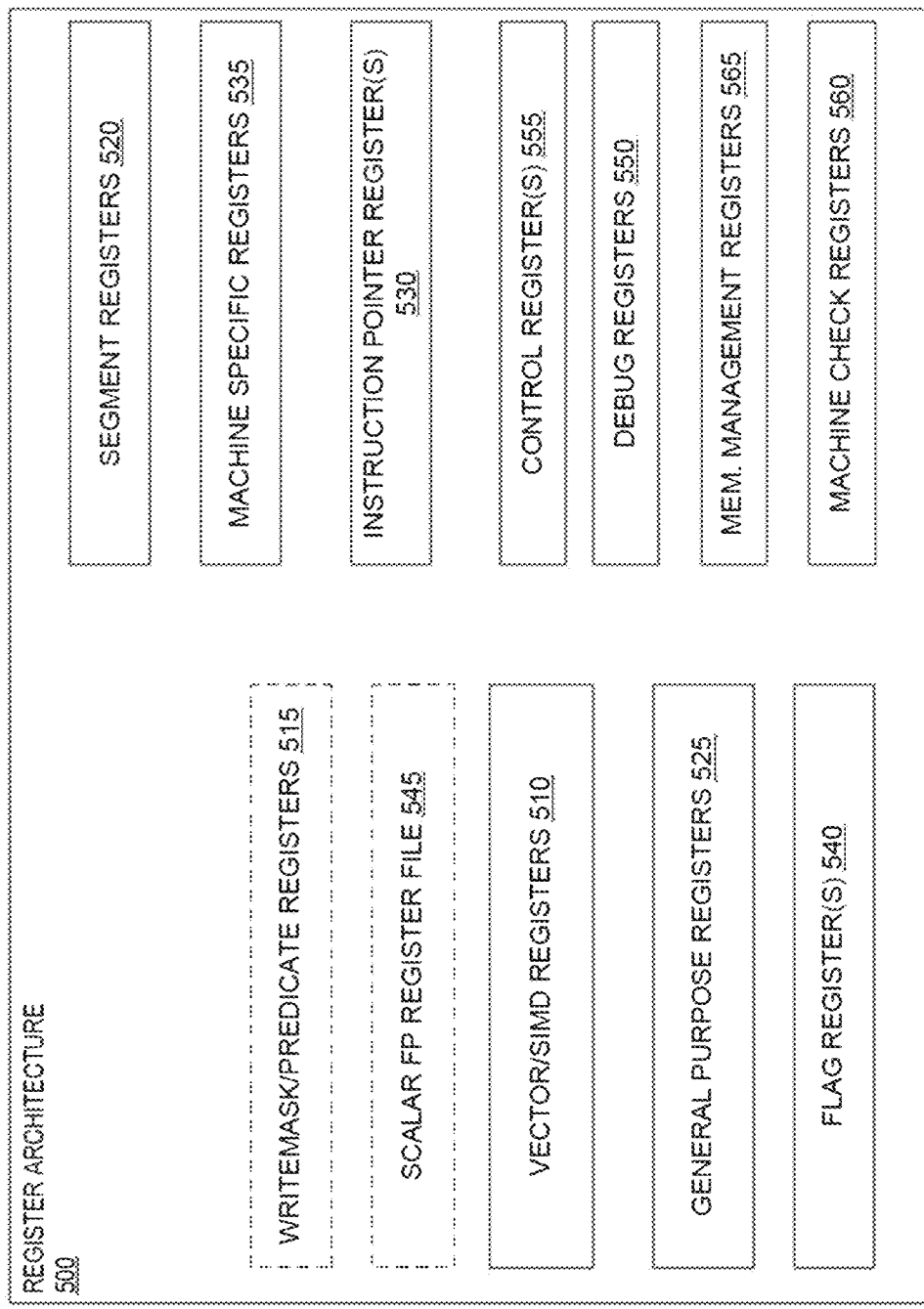
FIG. 5 illustrates one embodiment of a register architecture.

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 6:
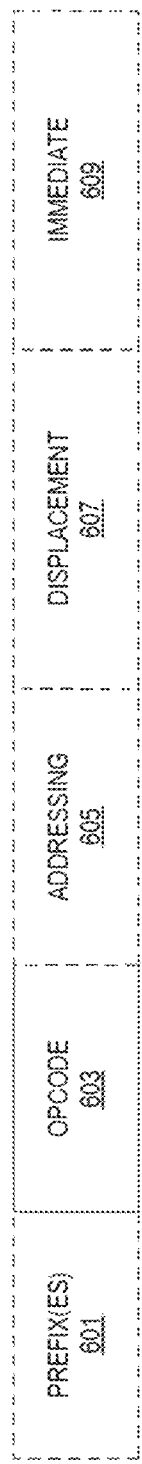
FIG. 6 illustrates one example of an instruction format.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

Figure 7:
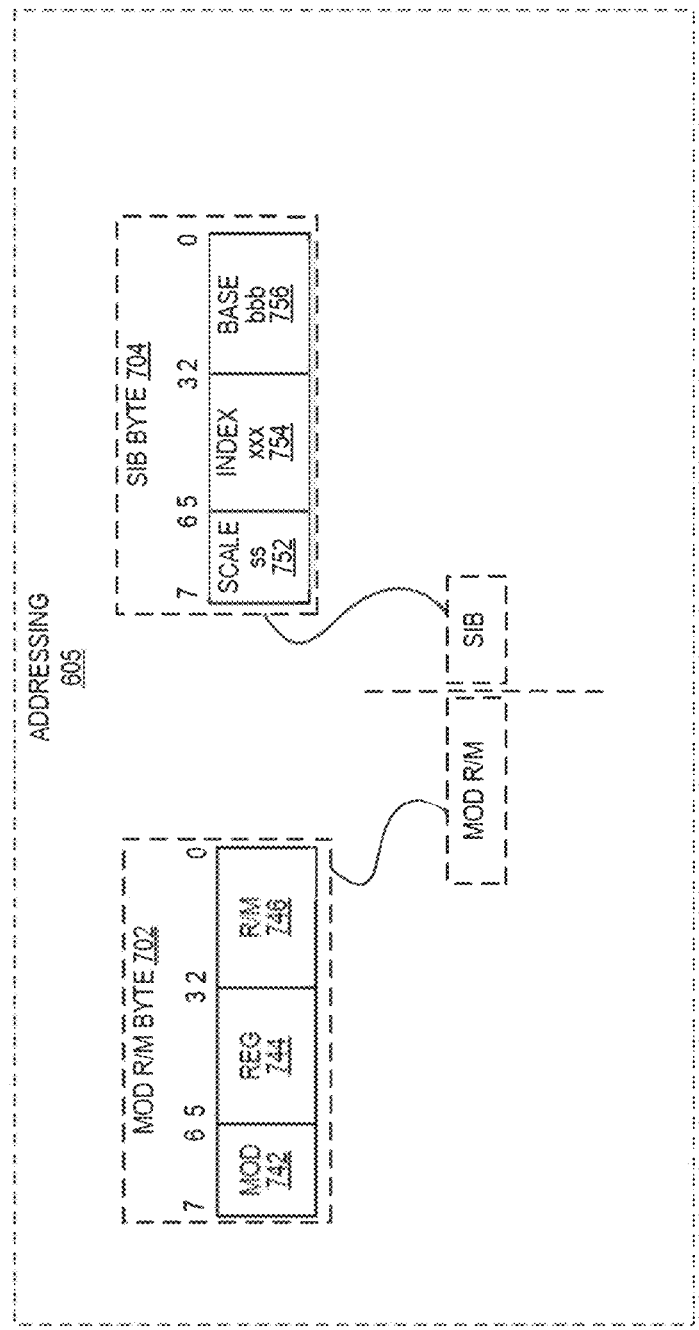
FIG. 7 illustrates addressing techniques in accordance with one embodiment.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

FIG. 8 illustrates embodiments of a first prefix 601(A). In some embodiments, the first prefix 601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 601(A) may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 704 is not used for memory addressing. FIG. 9(B) illustrates R and B from the first prefix 601(A) being used to extend the reg field 744 and R/M field 746 of the MOD R/M byte 702 when the SIB byte 704 is not used (register-register addressing). FIG. 9(C) illustrates R, X, and B from the first prefix 601(A) being used to extend the reg field 744 of the MOD R/M byte 702 and the index field 754 and base field 756 when the SIB byte 704 being used for memory addressing. FIG. 9(D) illustrates B from the first prefix 601(A) being used to extend the reg field 744 of the MOD R/M byte 702 when a register is encoded in the opcode 603.

Figure 10A:
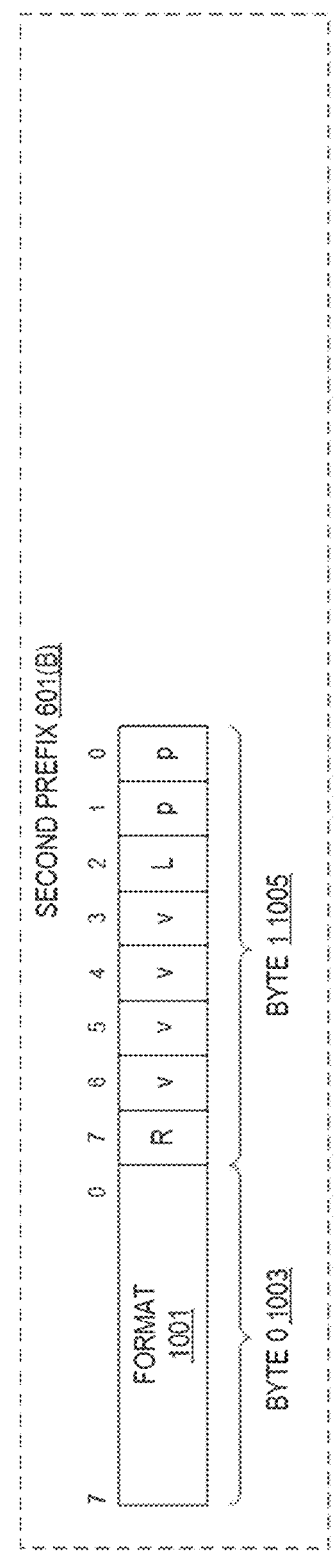
FIGS. 10A-B illustrate examples of a second instruction prefix.
Figure 10B:
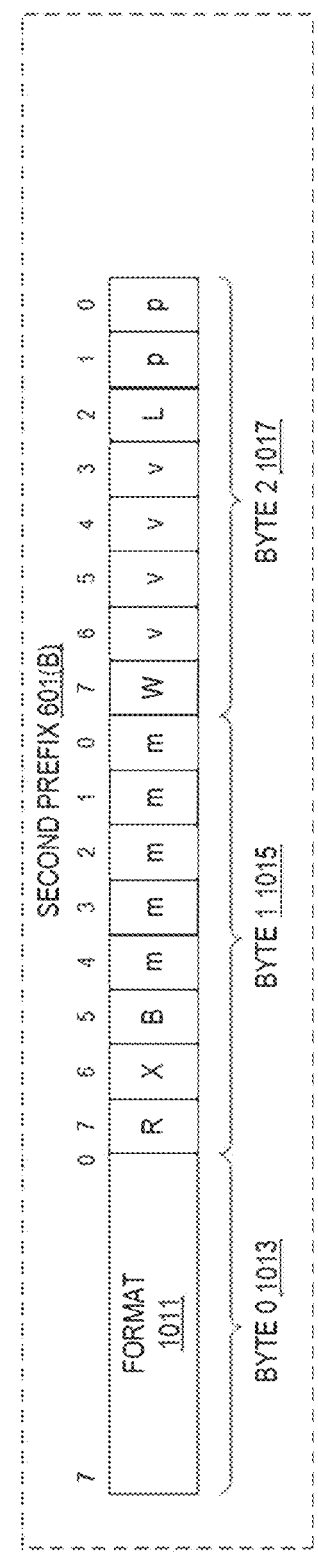

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionability equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

Figure 11:
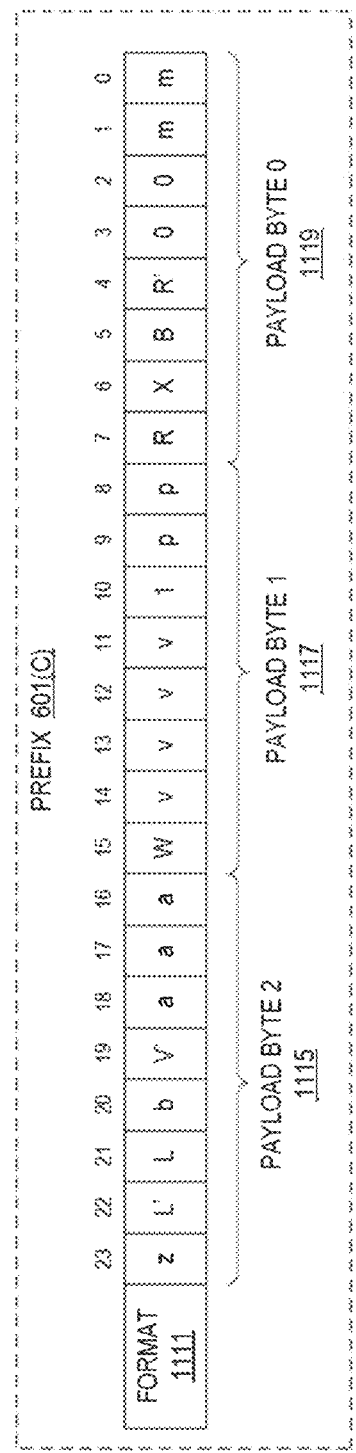
FIG. 11 illustrates payload bytes of one embodiment of an instruction prefix.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous FIG., such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |
| BASE | ModR/M R/M | GPR | Memor addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-7 | $1^{st}$ Source |
| {k1} | aaa | $k0^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
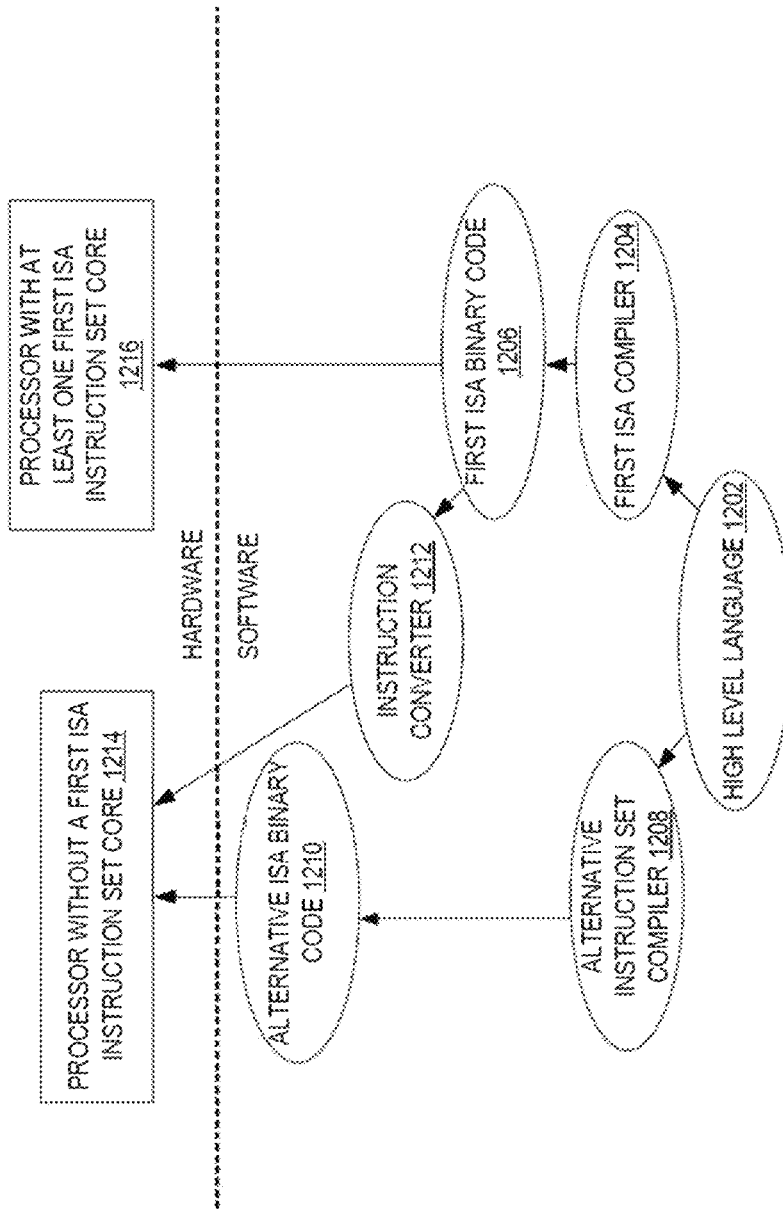
FIG. 12 illustrates instruction conversion and binary translation implementations.

FIG. 12 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

Apparatus and Method for Managing Unsupported Instruction Set Architecture (ISA) Features in a Virtualized Environment Deprecating ISA features is desirable for a variety of reasons including, but not limited to, reducing attack surfaces, simplifying the validation space, and reducing implementation efforts. However, removal of ISA features can be challenging given the fact that existing software which relies on these features may no longer work.

To mitigate this problem, embodiments of the invention provide virtualized support for a variety of deprecated ISA features. By way of example, and not limitation, in an x86 implementation, the deprecated features include the legacy interrupt descriptor table (IDT), the global descriptor tables (GDT), the local descriptor table (LDT), and the task-state segment (TSS). In one embodiment, a virtual machine (VM) is conFIG.d with operational modes in which certain deprecated instructions and instructions utilizing these deprecated features trigger a virtual machine exit (VMEXIT) and are emulated by the hypervisor. A small amount of legacy state may be maintained in the virtual machine control structure (VMCS) including, for example, the LDT, IDT, GDT, task register (TR), and the code segment (CS)/segment selector (SS).

1. Example Virtualization Architectures

Processor virtualization has been used to reduce the attack surface. However, using processor virtualization to reduce the attack surface often requires the execution of virtual machine (VM) operations including VM exit, VM context switch, and VM resume. These VM operations may be associated with expensive overheads. As the granularity of code becomes finer, frequent VM exit operations associated with context switches become the bottleneck to high performance computing.

The kernel of an operating system (either an operating system of a host machine or a guest operating system of a virtual machine) may include one or more components that provide services such as, memory management, task scheduling, process management, I/O management, drivers (e.g., file system and volume drivers, mass storage drivers, and bus drivers), and code integrity management services to software applications. The memory management service may use one or more page tables to provide memory address mappings between the guest virtual address space and the guest physical address space. The kernel may include components that are vulnerable to unauthorized modifications of the page tables themselves. Embodiments of the present disclosure add extensions to the virtual machine control structure (VMCS) that may be used to prevent the guest page table attack. A VMCS is a data structure (stored in the host physical address (HPA) space) containing operational states of the guest VM and the host machine. The operational states may include states of control registers, instruction pointers, and stack pointers. Data stored in VMCS may be organized into different groups including a guest-state area, a host state area and other fields relating to VM-execution control, VM-exit control, VM-entry control, and VM-exit information. Processor state (such as content stored in control registers, instruction pointer registers, and stack pointer registers of the processor) may be loaded from the guest-state area upon entering the VM and saved into the guest-state area upon exiting the VM, whereas the processor state may be loaded from the host-state area upon VM exits. Thus, the VM is associated with a current VMCS. The extensions may help secure the guest page table, thus securing the mapping between the guest virtual address space and the guest physical address space, and may allow fast switching (i.e., changing the corresponding page table) of guest memory address mappings without triggering VM exit operations, where the switching of guest memory address mappings includes updating the page tables for storing guest memory address mappings. A VM exit is a hardware-forced transition from the guest execution mode to the VMM execution mode in response to detecting one of the triggering events (such as an attempt to execute a certain privileged instruction or to access a certain memory address).

In some processor implementations, the base address (referred to as the root) of the page stable is stored in a control register (e.g., CR3) associated with the processor. For example, the CR3 may be used to store the physical address of a head entry in the page table. To secure the mapping between the guest virtual address space and the guest physical address space using the hardware-assisted virtualization features, the processor may:

1). set, by VMM, write protection in enhanced page tables (EPT) setup (e.g., by setting the write protection flag of the pages in the page tables) on the portion of the guest physical address space used by the current context and setting a VMEXIT control flag in the VMCS. This step ensures non-root page tables in page table hierarchy are not subject to modification from any inadvertent modifications.

2). set CR3 load VMEXIT control flag in VMCS. This step ensures that any inadvertent execution of a register instruction (e.g., mov cr3, <register>) by the guest cannot happen.

Both of above steps ensure that the guest virtual to guest physical addressing mapping cannot be modified without VMM's intervention. Both of these steps, however, trigger the VMEXIT operation and thus may introduce performance.

Setting of the CR3 load VMEXIT control flag forces the initiation of a VM exit operation (VMEXIT) prior to loading the root of the guest page table from the CR3 control register. After loading the root of the page table from the CR3 control register, the processor may execute VM entry operation (VMENTRY or VMRESUME) to resume execution of the virtual machine. This approach, however, increases the overall latency for switching between different memory address mappings by adding the round-trip time of VMEXIT and VMENTRY for each CR3 control register load by the guest operating system.

Embodiments of the present disclosure provide a virtual machine (VM) guest control mode (indicated by a VMX_GUEST_CR3_LOAD_CONTROL_BIT in the VMCS). Under the VM guest control mode (e.g., when VMX_GUEST_CR3_LOAD_CONTROL_BIT is set), a guest operating system may request a switch between memory address mappings without triggering the VM exit operations, if the guest operating system can provide an index value and a root value that match the corresponding root value retrieved by the VMM. Without the VM guest control mode, a request by the guest operating system to switch the memory address mappings would trigger a VM exit operation. Further, the VMCS may be expanded to include a control field to store a reference (e.g., an address pointer) linked to a host physical memory page in the physical address space. In one embodiment, the host physical memory page may be aligned by a page boundary in the physical address space. The host memory page may contain an array data structure (VMX_CR3_TARGET_ARRAY, referred to as the CR3 target array). The CR3 target array may contain entries, where each entry may be identified by an index value and include a certain number of bits (e.g., 64 bits). The virtual machine monitor may use an entry of the CR3 target array to store the root of a page table associated with a context (or a process) of the virtual machine. A context is a set of data used by a task (e.g., a process or a thread) saved in registers (or memory) that allow the task to resume after an interruption. The context of a VM is the set of data that allow the VM to resume from an interruption. Each time a guest operating system needs to switch the memory mapping between the guest virtual address space and the guest physical address space (e.g., due to a context switch), the guest operating system may provide both the index value and the root of the page table to the virtual machine monitor. The virtual machine monitor may retrieve the root value of the page table stored in the CR3 target array entry identified by the index value and compare the retrieved root value with the root value provided by the guest operating system. If the two root values do not match, the virtual machine monitor may trigger the VMEXIT operation with exit reason being control-register access exit (0x1c)' and report usual exit qualification of access to the CR3 register (as currently defined in existing architectures). Because this feature is mutually exclusive with existing VMEXIT control setting of CR3 exiting, the existing exit reason and exit qualification can be used without modifications.

Figure 13:
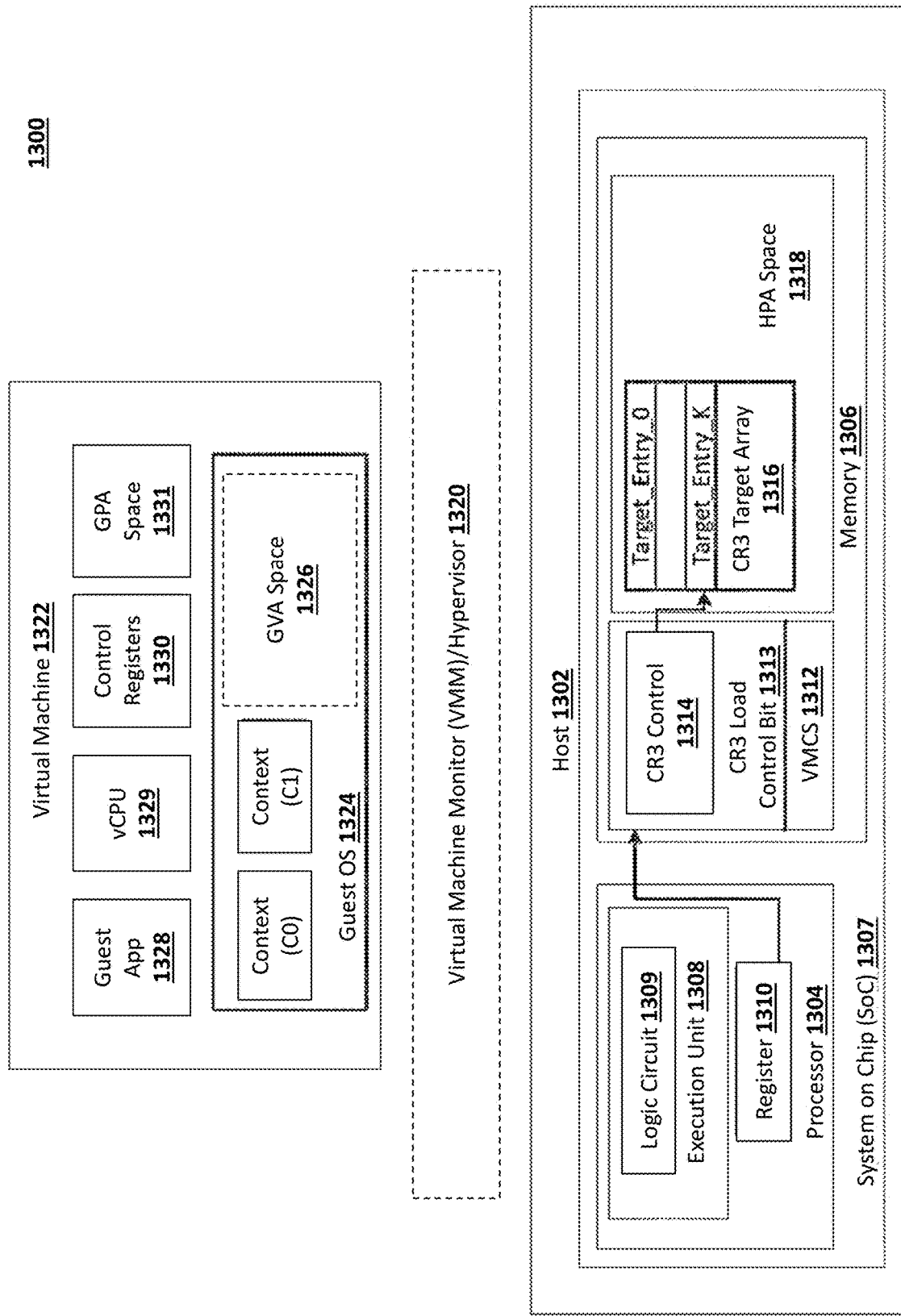
FIG. 13 illustrates one example of a virtualization environment on which embodiments of the invention may be implemented.

FIG. 13 illustrates a system 1300 for efficient switches of memory address mapping according to an embodiment of the present disclosure. A processor may change from executing a first task (a first process) to a second task (a second process). The change of tasks causes a switch of the corresponding contexts. The system 1300 may include a host 1302 such as, for example, a server computer or any suitable computing devices that support virtualization. Host 1302 may further include a processor 1304 and a memory 1306. In one embodiment, processor 1304 and memory 1306 may be implemented on a system-on-a-chip (SoC) 1307.

The processor 1304 may be a hardware processor such as a central processing unit (CPU) that includes one or more processing cores (not shown) that may be conFIG.d to execute system software and user application software. The memory 1306 may be a suitable type of storage device to store instructions of software applications and the data associated with the software applications. Memory 1306 may be addressed according to memory addresses defined in a host physical address (HPA) space 1318.

Processor 1304 may further include an execution unit 1308 to execute instructions and a register 1310 to store data. In one embodiment, execution unit 1308 of processor 1304 may include a logic circuit 1309 implemented to support execution of a set of virtualization instructions (virtual-machine extension (VMX)) to provide support for one or more virtualization environments ported on host 1302. The VMX may provide processor-level support for virtual machines. In one embodiment, the VMX may refer to hardware features corresponding to instructions to generate a virtual machine monitor (VMM) 1320 that is a host program that allows one or more execution environments (or virtual machines (VMs)) to run on the host 1302. Referring to FIG. 13, VMM 1320 may create and support the operations of virtual machines (VMs) 1322. Alternatively, execution unit 1308 may execute VMX instructions to directly generate VMs 1322 without the need for VMM 1320.

VMs 1322 may behave like a regular computing device including a virtual CPU (vCPU) 1329. The vCPU 1329 associated with VMs 1322 may execute a respective guest operating system (guest OS) 1324. Guest applications 1328 may run within the environments of guest operating systems 1324. Guest operating systems 1328 (including a kernel) may include a number of guest-OS components (or kernel components) to provide a number of services to guest applications 1328 including memory address management.

VMs 1322 may access memory 1306 through a series of memory space mappings. Each VM 1322 may construct a guest virtual address (GVA) space 1326 that may be mapped to a corresponding guest physical address (GPA) space 1331, for the VM 1322. A control register (e.g., CR3) 1330 associated with the processor 1304 may contain the base address of the page directory that may be used to calculate a mapping between the GVA space 1326 and the corresponding GPA space 1331 for the VM 1322. In one implementation, control register 1330 can be a virtualized control register that corresponds to a physical control register associated with host processor 1304. The GPA space 1331 of the VM 1322 may be further mapped to the host physical address (HPA) space 1381 of the host system 1302. The mapping from the GPA space 1331 of a VM 1322 to the HPA space of the host may be translated via the extended page table (EPT) associated with the current VMCS running on the processor 1304. In some implementations, the GPA space 1331 and the HPA space 1318 may be the same, thus GVA space 1326 may be directly mapped to HPA space 1318.

VMs can be created and removed from host 1302 by executing appropriate VMX instructions. Execution unit 1308 of processor 1304 via logic circuit 1309 may execute VMX instructions to implement life cycles of VMM software and associated VMs. FIG. 2 illustrates a life cycle of VMM 1320 and the associated VMs 1322 according to an embodiment of the present disclosure. As shown in FIG. 2, a host software application executing by execution unit 1308 on processor 1304 may enter VMX operations by executing a VMX start instruction (e.g., VMXON) to start VMM 1320. Under the VMX operations, VMM 1320 can then enter VMs 1322 by executing VM entry instructions (e.g., VMLAUNCH or VMRESUME). End users may use created VMs to run guest applications. A guest application may be associated with a first context (C0) that may be switched to a second context (C1) through a context switch process. After the use of VMs, VMM 1320 can regain control using VM exit instructions that would stop the VMs.

Thus, VMX operations are divided into root operations under which VMM runs and non-root operations under which the guest software (e.g., VMs and guest OS) runs. Therefore, there are two kinds of VMX transitions: transitions into VMX non-root operation (VM entries) from root operations and transitions from VMX non-root operation to VMX root operation (VM exits).

Processor 1304 of the host 1302 may control non-root operation and VMX transitions using virtual machine control structures (VMCSs). A VMCS is a data structure (stored in the HPA space) containing operational states of the guest VM and the host machine. The operational states may include states of control registers (e.g., CR3), instruction pointers, and stack pointers. VMM 1320 may manage access to the VMCSs using a VMCS pointer (one per virtual processor or logic processor) stored in register 1310. VMM 1320 may conFIG. a VMCS using VMX operations (e.g., VMREAD, VMWRITE, and VMCLEAR). A VMCS is a data structure that includes data fields to store parameters associated with a VM context (C0, C1) for VMs supported by host 1302. Thus, VM 1322 may run under the first VM context (C0) as the active context based on a first set of parameters stored in VMCS, and then switch to the second VM context (C1) as the active context based on a second set of parameters stored in the VMCS. VMM 1320 may have access via the HPA to a number of active VMCSs stored in memory 1306 as shown in FIG. 13. At a given time, one VMCS is current and is used to specify the VM context for a currently-running VM with respect to one virtual processor.

In one embodiment, as shown in FIG. 13, memory 1306 may include one or more regions (referred to as VMCS regions) to store active VMCSs 1312. For example, each VMCS region may contain parameters associated with one VMCS that can be used to specify a VM context. In response to receiving a request for VM entry, VMM 1320 may determine a current VMCS based on the request and use the current VMCS to specify the VM context. Processor 1304 may include or be associated with a register 1310 to store the VMCS pointer to the current VMCS (e.g., as shown in FIG. 13, VMCS 1312). Register 1310 may store a reference (e.g., a memory address in the HPA space 1318) to the location where the current VMCS 1312 is stored.

Parameter values stored in VMCS 1312 may be organized into different groups including a guest-state area, a host state area and other fields relating to VM-execution control, VM-exit control, VM-entry control, and VM-exit information. Processor state (such as content stored in control registers, instruction pointer registers, and stack pointer registers of the processor) may be loaded from the guest-state area upon entering the VM and saved into the guest-state area upon exiting the VM, whereas the processor state may be loaded from the host-state area upon VM exits. Thus, the VM is associated with a current VMCS.

In one embodiment, the guest-state area of VMCSs 1312 may further include fields to store processor state that is loaded from these fields on every VM entry of the corresponding VM and saved into these fields on every VM exit. These fields may store, but not limited to, content of control registers (e.g., CR3) that may be used to calculate a mapping from the guest virtual address (GVA) to the guest physical address (GPA) of the VM, content of instruction pointer registers (RIP), and content of stack pointer registers (RSP). These fields may optionally include a field to store a pointer to the extended page table (EPTP) that may be used to calculate a mapping from the guest physical address (GPA) space to host physical address (HPA) space of the VM. The host-state area may include similar fields to store processor state upon VM exits.

Guest operating systems (including kernels) 1324 may provide different services to guest applications 1328 and manage different processes associated with these applications 1328. Each process may be associated with a corresponding context (C0, C1 etc.) specified in the GVA space 1326. In some implementations, vCPU 1329 may execute one process associated with a current context (in an active state) while other contexts are in an idle state. One or more pages in a page table may contain the memory address mapping to translate the addresses associated with a current context in the GVA space 1326 to the GPA space 1331. The guest OS 1324 may use a base address (or root) referencing to the one or more pages in the page table used to determine the current memory address mapping. In some implementations, the guest OS 1324 may store the root in one of the CR3 control registers 1330. When guest OS 1324 switches from the current process to another process, guest OS 1324 may need to update pages in the page table used to provide the current memory address mapping. For example, guest OS 1324 may need to load, from one of the CR3 control registers, a new root for the pages in the page table to provide the memory address mapping for the newly activated process.

As discussed above, to prevent malicious memory address attack by a guest application, the guest OS 1324 may write-protect memory pages that store the guest page tables. The write-protect may be achieved by setting the write prevention bits associated with these pages. In some implementations, to ensure the security of the root stored in the CR3 control register, processor 1304 may further execute a VM exit operation (VMEXIT) prior to loading the root from the CR3 control register and execute a VM entry instruction (VMENTRY) after loading the root from the CR3 control register. Therefore, current approaches to reducing the attack surface require frequent switches of the entire VMCS (i.e., VM exits) which can be computationally expensive.

To reduce the overhead associated with executing the VMEXIT and VMENTRY associated with loading a CR3 control register, embodiments of the present disclosure provide a CR3 load control mode under which the VMM 1320 may determine whether the content of the CR3 control registers can be trusted. If VMM 1320 determines that the CR3 control registers can be trusted (e.g., it has not been tampered with by the guest application), VMM 1320 may allow the guest OS 1324 load the root value associated with the pages in the page table without triggering the VM exit instruction, where the root value may reference the next memory address mapping associated with a new context.

In one embodiment, VMCS 1312 may include a CR3 load control bit (a bit flag) to indicate whether the VM guest control mode is enabled. When the CR3 load control bit is set "1", VMM 1320 enters into the VM guest control mode. VMCS 1312 may further contain a CR3 control field 1314 to store a reference to a CR3 target array 1316. CR3 target array 1316 may be stored in the host memory that can be referenced by a host physical address in the HPA space 1318. Since CR3 target array 1316 is stored and accessed in the HPA space 1318, it is not directly accessible by the guest OS 1324. Instead, the guest OS 1324 needs to employ VMM 1320 and/or host operating system to access the HPA space 1318. Thus, VMM 1320 may store trusted values in CR3 target array 1316. In one embodiment, VMM 1320 may store CR3 target array 1316 in a host physical memory page with the reference to the CR3 target array 1316 aligned with a page boundary. Thus, CR3 target array 1316 can be referenced according to a page number in HPA space 1318.

In one embodiment, entries of the CRE target array 1316 may be referenced by the respective index values. Each entry, identified by a unique index value, may include a certain number of bits (e.g., 64 bits) to store flags and a CR3 root. FIG. 3 illustrates a CR3 target array according to an embodiment of the present disclosure. As shown in FIG. 3, the host physical space 300 of a memory may contain a virtual machine control structure (VMCS) 302 and a page-aligned CR3 target array 304. VMCS 302 may contain a control field 306 to store a reference to the CR3 target array 304. CR3 target array may further include entries that are identified by index numbers.

For example, as shown in FIG. 3, CR3 target array 304 may include 64-bit entries 308A, 308B, . . . , 308N that are identified by Index_1, Index_2, . . . , Index_N. Each entry may include a first bit (V, at bit position 63) to indicate whether the entry is a valid entry. For example, if V is set to "1," the entry is valid; otherwise, the entry is invalid. The entry may include a second bit (A, at bit position 62) that is set to "1" by processor 1302 whenever processor 1302 switches the memory address mappings using the index value and the root value stored in an entry 308A, 308B, . . . , 308N without triggering the VM exit operation. The A bit is set after it is determined that the root values match. For example, A set to "1" means that the requested CR3 value and the CR3 value stored in the entry match, and the CR3 load has proceeded. The entry may further include reserved bits (bits 52-61) that should be clear. The entry may further include a CR3 field (bits 0-51) to store a CR3 value. The CR3 value stored in the CR3 field is trusted by the VMM and used to match with the CR3 value provided by the guest OS. In one embodiment, the CR3 target array may include 512 entries.

In one embodiment, the VMM may use the index values (Index_1, Index_2, . . . , Index_N) and the CR3 values stored in the entries 308A, 308B, . . . , 308N to verify the integrity of guest application. Referring to FIG. 13, when a guest OS 1324 creates a new GVA space (e.g., in conjunction with creating a new process), guest OS 1324 may issue a hypercall to VMM 1320 to request VMM 1320 to store the root of the page table that stores the memory address mapping between the GVA space to the GPA space. The hypercall is a software trap issued by the guest OS 1324 to VMM 1320 to request privileged operations such as, updating the page table. The root value may be stored in a CR3 control register 1330 associated with the VM 1322. Responsive receiving the hypercall including the status indicating that VMM 1320 has successfully stored the new value in the CR3 target array and returned an index value to the guest OS, the guest OS may make the mov CR3<value> instruction without triggering the VM exit operation. Prior to receiving the hypercall, the mov CR3<value> issued by the guest OS triggers the VM exit operation. Responsive to determining that the CR3 control bit is set to "1," VMM 1320 may store the received root value in an entry in the CR3 target array 1316, where the entry is identified by an index value. Responsive to storing the CR3 value in the entry (and setting the V bit to valid), VMM 1320 may return the index value to guest OS 1324. Guest OS 1324 may store the index value in a data structure private to the VM.

When guest OS 1324 needs to switch the GVA space (by switching the CR3 control register that stores the root for the mapping between the GVA space and GPA space), guest OS 1324 may need to provide the root value stored in CR3 control register and the index value to the VMM 1320 for verification. VMM 1320 may compare the root value received from the guest OS 1324 with the root value stored in the entry identified by the received index value. If they match, VMM 1320 may allow the GVA space switch (by switching the CR3 control register) without triggering the VM exit operation, thus allowing a secure, fast switch. In one embodiment, processor 1304 may set the A bit (referred to as the access status bit) to "1" to indicate that processor 1304 has performed CR3 switch without the VM exit operation by making sure that the root value stored in the entry is matched to a root value provided by the guest OS 1324.

When guest OS 1324 deletes a GVA space (or a corresponding process), guest OS 1324 may destruct pages that store the memory address mapping between the GVA space and the GPA space. Guest OS 1324 may further make another hypercall (as defined above) to VMM 1320 to inform VMM 1320 of the destruction of the GVA space associated with an index value. VMM 1320 may remove the entry identified by the index value. In one embodiment, VMM 1320 may set the V bit to "0."

In one embodiment, the access status bit (A bit) of each entry in CR3 target array 1316 may be used to indicate the time that the entry has been in CR3 target array 1316.

Thus, the A bit is set whenever processor 1304 determines that the root value in the request matches the root value stored in CR3 target array 1316. In one embodiment, VMM 1320 may be associated with a private data structure to store an age count ("AgeCount") associated with a corresponding entry in CR3 target array 1316. VMM 1320 may periodically scan all entries in CR3 target array. If VMM 1320 determines that the A bit of an entry is set (meaning that processor 1304 recently switched to the memory address space), VMM 1320 may increment the AgeCount associated with the corresponding entry. If VMM 1320 determines that the A bit of an entry is cleared (meaning that processor 1304 recently switch off the memory address space), VMM 1320 may decrement the AgeCount associated with the corresponding entry. After each scan of the CR3 target array 1316, VMM 1320 may clear all A bits so that VMM 1320 may determine if the A bit has been set since the last scan. Thus, the access status bit may be used to implement a Least Recently Used (LRU) algorithm. In the event that all 512 entries in the CR3 target array have been used up, the LRU algorithm may select the least recently used entry to evict and make space for a new entry.

In another embodiment, an existing instruction may be modified to achieve the VM exit free guest memory address space switching. For example, certain bits (e.g., bit 52-62) of the operand of the register mov CR3<register operand> instruction may be used to store the index value that identifies a corresponding entry in the target array. Thus, responsive to executing mov CR3<register operand>, the processor may first determine if the CR3 load control bit stored in VMCS is set. Responsive to determining that the CR3 load control bit is not set, the processor may initiate the VM exit operation. Responsive to determining that the CR3 load control bit is set, the processor may retrieve the index value from the operand (e.g., bits 52-62), and retrieve, based on the index value, the root value stored in a corresponding entry of the target array. The retrieved target value may be compared to a root value encoded in the operand to determine whether the guest memory address mapping can be switched without initiating the VM exit operation. In one embodiment, the modified mov CR3<register operand> instruction may be executed independent of whether the VM guest control mode is set or not. In another embodiment, the modified mov CR3 <register operand> instruction may be executed only when the VM guest control mode is set.

In another embodiment, a new virtualization support instruction may be added to VMX to the VM exit free guest memory address space switching. The new virtualization instruction may include a first reference to a register for storing the index value and a second reference to the CR3 control register. The new virtualization instruction may be enabled when the CR3 load control bit is set; the new virtualization instruction may be disabled when the CR3 load control bit is not set. The guest OS may trigger the new virtualization instruction to initiate the VM exit free guest memory address space switching.

2. Managing Unsupported ISA Features with Virtualization

In one embodiment, for all legacy instructions that are not supported by the modes of the new architecture (e.g., virtual machine extensions (VMX)), microcode is executed to handle the common-case legacy behavior. If the legacy behavior requires complex system interaction, such as the examples provided herein, a VMEXIT is performed and the hypervisor emulates the complex behavior. Extremely infrequent cases, such as real and protected mode execution that is typically required for boot, can be interpreted by the hypervisor at an acceptable overhead.

Figure 14:
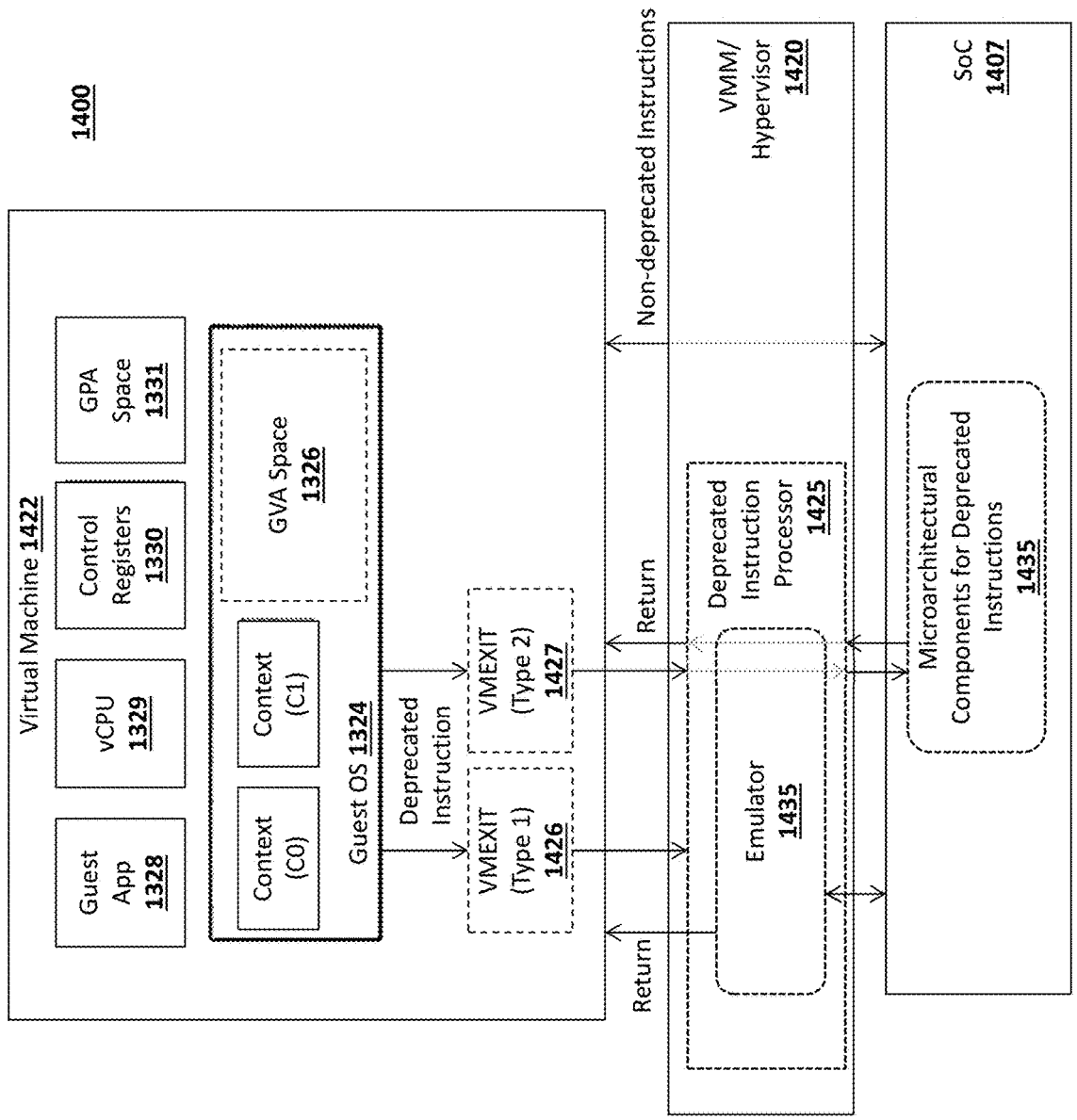
FIG. 14 illustrates one embodiment of the present disclosure including a deprecated instruction processor.

One embodiment is illustrated in FIG. 14 in which virtualization techniques are used to emulate legacy behavior. In particular, in response to detecting legacy instruction, the virtual machine 1422 executes a VMEXIT 1426, 1427 in accordance with the following options:

Option 1: This option is implemented with no modifications to existing microarchitectures, but provides lower performance. In response to detecting a deprecated instruction or access to a deprecated state, an Invalid/Undefined Opcode exception (#UD) triggers a first type of VMEXIT 1426. A deprecated instruction processor 1425 detects the first type of VMEXIT 1426, which may require complex system interactions, and an emulator 1435 emulates the complex behavior. While this approach is limited in performance, it comes at no cost since no architectural changes are required to the SoC 1407 microarchitecture.

Option 2: In one embodiment, a second type of the VMEXIT instruction 1427 is executed for certain legacy instructions which provides additional information for instructions combined with partial hardware support for the legacy architecture state. In this embodiment, the deprecated instruction processor 1425 of the hypervisor 1420 relies on the microarchitectural components 1435 provided by the SoC 1407 to efficiently process these types of legacy instructions. In one implementation, the deprecated instruction processor 1425 executes one or more privileged instructions which access the microarchitectural components 1435 using parameters indicated by the VMEXIT 1427, and return results to the virtual machine 1422 (which may then return the results to the guest OS 1324 which updates the relevant execution context (e.g., C0, C1)). Alternatively, or in addition, the hypervisor 1420 validates the VMEXIT 1427, which is executed directly by the microarchitectural components 1425 and returns the results directly to the virtual machine 1422.

In both types of VMEXIT 1426, 1427, the deprecated instruction processor 1425 of the hypervisor 1420 emulates deprecated instructions and operations related to deprecated state and returns execution to the VM 1422. If instructions requiring these VMEXITs 1426, 1427 are infrequent, then they will not result in poor performance of the legacy VM 1422. Non-deprecated instructions and those not interacting with deprecated state will operate at native performance regardless of their frequency.

In order to reduce complexity and increase performance of the hypervisor 1420, in one embodiment, a new type of exception is delivered to the hypervisor 1420 when a legacy instruction is executed. Instead of delivering a generic "invalid opcode" exception, a more specific exception is delivered which provides the deprecated instruction processor 1425 a "fast-path" for handling legacy instructions, instead of considering all possibilities that could generate the #UD exception.

To demonstrate the viability of this approach, several legacy 64b workloads were profiled, running on different operating systems. Using a full-system simulator, occurrences of instructions that are not supported in the new microarchitecture were counted in non-virtualized mode (e.g., legacy OS instructions).

FIG. 15 illustrates the results, showing the frequency of relevant instructions in 64-bit long mode (per-thousand instructions ("PKI")). A dash means the instruction was never observed (in some cases these are illegal in long mode). These results indicate that most of the depreciated instructions are rarely executed, further validating the trap-and-emulate approach described herein. These profiling experiments show that the majority of the legacy state interactions and instructions occur during ring transitions.

The two tables 1601-1602 in FIGS. 16A-B below enumerate the state modified on the ring0-to-ring3 transition and ring3-to-ring0 transitions, respectively. These tables cover 64-bit long-mode operation. The first column 1610 of table 1601 indicates the type of transition operation for ring 0-ring 3 transition and the first column 1611 of table 1602 indicates the type of return operation for the ring 0-to-ring 3 transition.

The additional columns in tables 1601-1602 denote architectural state that is modified on each respective transition operation, with the cell values denoting where the modified value comes from. While the SYSCALL and SYSRET interact with legacy state, the behavior interacts with far less legacy state than a call-gate, an exception, an interrupt, or the IRET instruction. SYSCALL and SYSRET load segmentation state values from MSRs are straightforward to handle. Call-gates occur infrequently and can be handled with a trap-and-emulation approach. IRETQ instructions stand-out as they are executed much more frequently. IRETQ presents a much more challenging case as it potentially interacts with a large amount of segmentation state and is currently implemented with a complicated microcode flow on existing machines.

As IRET and legacy interrupt delivery are commonly executed in legacy workloads, an implementation of both needs to be performant. In one embodiment, it is processed with "enlightened microcode" in VMX mode. In this approach, common-case behavior executes in microcode, using a minimal amount of legacy state as required. Uncommon case behavior that requires extensive interaction with segmentation-state, microcode causes a VMEXIT. Embodiments of the invention may include new mechanisms for system architecture, maintaining a relatively small amount of legacy register support.

Figure 17:
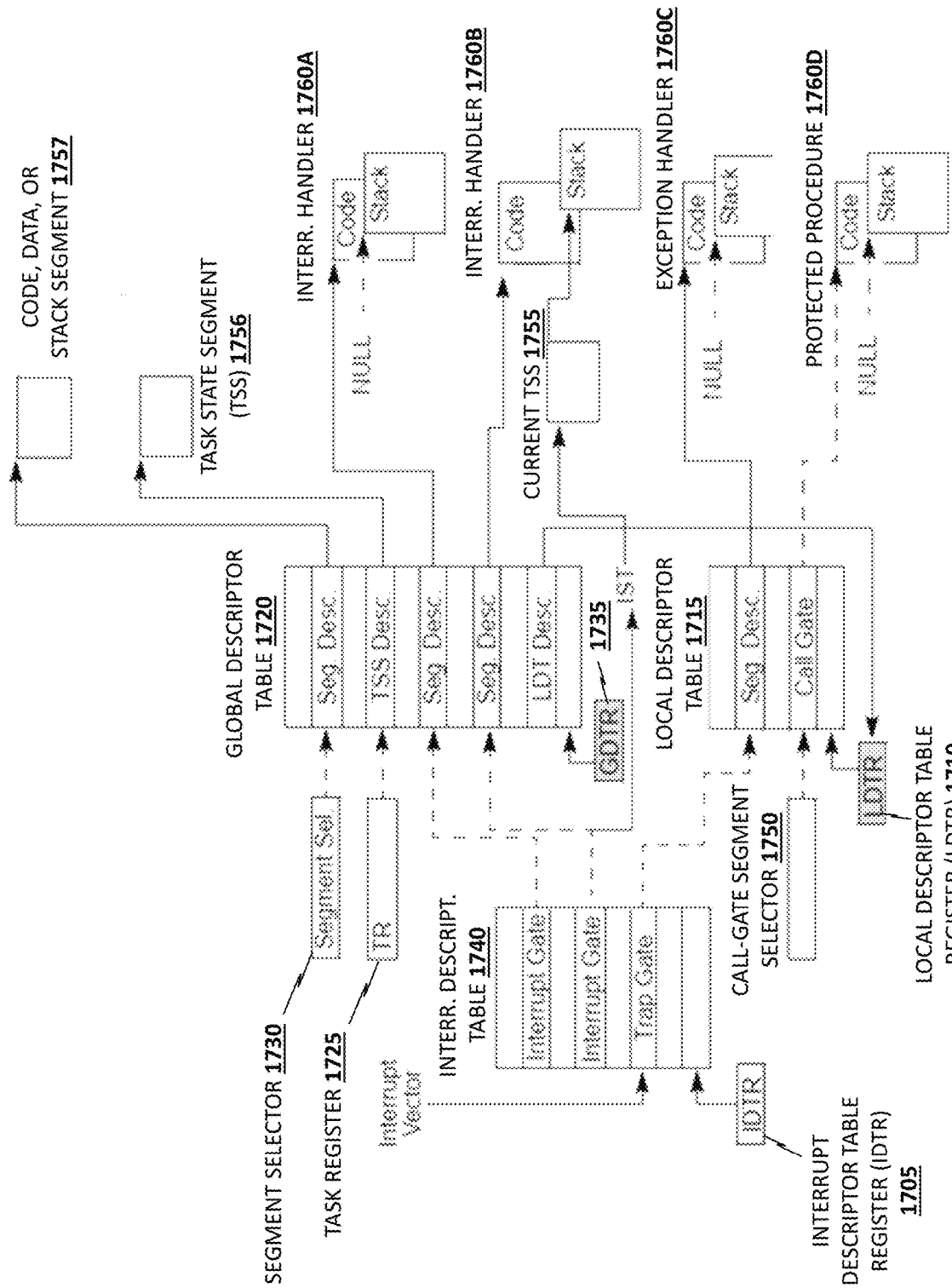
FIG. 17 illustrates deprecated state structures managed in accordance with one embodiment of the invention.

FIG. 17 illustrates examples of this legacy state support included in one embodiment. The illustrated state includes the interrupt descriptor table register (IDTR) 1705 which stores a pointer to the interrupt descriptor table 1740, a global descriptor table (GDT) register 1735 for storing a pointer to a GDT 1720, a segment selector 1730 storing a pointer to a segment descriptor in the GDT 1720, and a task register 1725 for storing a pointer to a task state segment (TSS) entry in the GDT 1720. In addition, a local descriptor table register (LDTR) 1710 stores a pointer to a local descriptor table (LDT) 1715 and a call-gate segment selector 1750 includes a pointer to a call gate entry in the LDT 1715. The IDT 1740, GDT 1720, and LDT 1715 point to various data structures including code, data, or stack segment 1757, the Task State Segment (TSS) 1756, interrupt handlers 1760A-B, exception handlers 1760C, and protected procedures 1760D.

Based on this state, the situations where a VMEXIT would be required to support legacy behavior to perform legacy interrupt delivery and to execute the IRETQ instruction have been evaluated. The program code shown in FIGS. 18A-I reflects one embodiment which emulates these operations while relying on a small number of legacy registers only in virtualization mode. These registers may be implemented as MSRs, loaded from a fixed offset in the VMCS, or directly supported in logic. The other operations in the illustrated program code flow rely on conventional computation microoperations (e.g. loads, adds, etc) that are executed directly by the SoC microarchitecture 1407, in one embodiment.

One implementation also includes counters to the virtualization implementation (e.g., QEMU in one embodiment), to profile existing legacy operating systems. This provides information on the frequency of exits due to complex legacy behavior in event delivery and IRETQ. In the example code sequence shown below, within the function "do_interrupt64" for the interrupt flow and helper_iret_protected/ helper_ret_protected for IRETQ, the counters "int_exit_cases" and "iret_exit_cases" record specific exit conditions. These counters correspond to situations where the SoC microarchitecture needs to perform a VMEXIT to emulate complex behavior.

Today, booting a processor (e.g., an x86 CPU) generally requires the use of real and protected modes, which make heavy use of features that are targets for deprecation, including features that increase the attack surface exposed by the ISA, require complex validation, and generally make it challenging to introduce new features while at the same time providing little value. In one embodiment of the invention, during these states (e.g., real and protected mode code executed during boot) the deprecated instruction processor 1425 in the hypervisor 1420 emulates/interprets this small number of instructions as needed (e.g., using an instruction interpreter or similar technology).

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1. A processor comprising: a plurality of cores, each core comprising a current microarchitecture to execute instructions and process data, the current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture; at least one core of the plurality of cores comprising: a decoder to decode the instructions, the decoder to specify one or more microoperations corresponding to each of the instructions; execution circuitry to execute the corresponding microoperations; wherein either a first type or a second type of virtual machine exit is to be performed responsive to detecting a deprecated instruction in a first virtual machine, wherein responsive to the first type of virtual machine exit, the hypervisor is to perform a first emulation of the prior microarchitecture without reliance on the partial hardware support, and wherein responsive to the second type of virtual machine exit, the hypervisor is to perform a second emulation of the prior microarchitecture relying on the partial hardware support.

Example 2. The processor of example 1 wherein the partial hardware support comprises microcode including one or more emulation microoperations to execute the deprecated instruction on the execution circuitry.

Example 3. The processor of example 1 wherein the first type of virtual machine exit comprises or is to be triggered by a first type of exception.

Example 4. The processor of example 2 wherein the hardware support comprises one or more microarchitectural components including one or more registers for storing state values and/or execution circuits for executing the emulation microoperations.

Example 5. The processor of example 4 wherein the second type of virtual machine exit is to specify parameters associated with the deprecated instruction, the parameters to be used to execute the emulation microoperations.

Example 6. The processor of example 5 wherein upon completion of the first emulation or the second emulation, the hypervisor is to provide results and return control to the first virtual machine.

Example 7. The processor of example 3 wherein the first type of exception comprises an invalid or undefined opcode exception.

Example 8. The processor of example 7 wherein the second type of virtual machine exit comprises or is to be triggered by a second type of exception, the second type of exception to specify parameters associated with the deprecated instruction.

Example 9. A method comprising: executing instructions on at least one core of a plurality of cores, each having a current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture; performing either a first type or a second type of virtual machine exit responsive to detecting a deprecated instruction in a first virtual machine, performing by the hypervisor, responsive to the first type of virtual machine exit, a first emulation of the prior microarchitecture without reliance on the partial hardware support, and performing by the hypervisor, responsive to the first type of virtual machine exit, a second emulation of the prior microarchitecture relying on the partial hardware support.

Example 10. The method of example 9 wherein the partial hardware support comprises microcode including one or more emulation microoperations to execute the deprecated instruction on the execution circuitry.

Example 11. The method of example 9 wherein the first type of virtual machine exit comprises or is to be triggered by a first type of exception.

Example 12. The method of example 10 wherein the hardware support comprises one or more microarchitectural components including one or more registers for storing state values and/or execution circuits for executing the emulation microoperations.

Example 13. The method of example 12 wherein the second type of virtual machine exit is to specify parameters associated with the deprecated instruction, the parameters to be used to execute the emulation microoperations.

Example 14. The method of example 13 wherein upon completion of the first emulation or the second emulation, the hypervisor is to provide results and return control to the first virtual machine.

Example 15. The method of example 11 wherein the first type of exception comprises an invalid or undefined opcode exception.

Example 16. The method of example 15 wherein the second type of virtual machine exit comprises or is to be triggered by a second type of exception, the second type of exception to specify parameters associated with the deprecated instruction.

Example 17. A machine-readable medium having program code stored thereon which, when executed by a machine, causes the machine to perform the operations of: executing instructions on at least one core of a plurality of cores, each having a current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture; performing either a first type or a second type of virtual machine exit responsive to detecting a deprecated instruction in a first virtual machine, performing by the hypervisor, responsive to the first type of virtual machine exit, a first emulation of the prior microarchitecture without reliance on the partial hardware support, and performing by the hypervisor, responsive to the first type of virtual machine exit, a second emulation of the prior microarchitecture relying on the partial hardware support.

Example 18. The machine-readable medium of example 17 wherein the partial hardware support comprises microcode including one or more emulation microoperations to execute the deprecated instruction on the execution circuitry.

Example 19. The machine-readable medium of example 17 wherein the first type of virtual machine exit comprises or is to be triggered by a first type of exception.

Example 20. The machine-readable medium of example 18 wherein the hardware support comprises one or more microarchitectural components including one or more registers for storing state values and/or execution circuits for executing the emulation microoperations.

Example 21. The machine-readable medium of example 20 wherein the second type of virtual machine exit is to specify parameters associated with the deprecated instruction, the parameters to be used to execute the emulation microoperations.

Example 22. The machine-readable medium of example 21 wherein upon completion of the first emulation or the second emulation, the hypervisor is to provide results and return control to the first virtual machine.

Example 23. The machine-readable medium of example 19 wherein the first type of exception comprises an invalid or undefined opcode exception.

Example 24. The machine-readable medium of example 23 wherein the second type of virtual machine exit comprises or is to be triggered by a second type of exception, the second type of exception to specify parameters associated with the deprecated instruction.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) conFIG.d to perform certain operations or having a predetermined functionality or software instructions stored in memory embodied in a non-transitory computer readable medium. Thus, the techniques shown in the FIG.s can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
 a plurality of cores, each core comprising a current microarchitecture to execute instructions and process data, the current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture;
 at least one core of the plurality of cores comprising:
  a decoder to decode the instructions, the decoder to specify one or more microoperations corresponding to each of the instructions;
  execution circuitry to execute the corresponding microoperations;
 wherein either a first type or a second type of virtual machine exit is to be performed responsive to detecting a deprecated instruction in a first virtual machine,
 wherein responsive to the first type of virtual machine exit, the hypervisor is to perform a first emulation of the prior microarchitecture without reliance on the partial hardware support, and
 wherein responsive to the second type of virtual machine exit, the hypervisor is to perform a second emulation of the prior microarchitecture relying on the partial hardware support.

2. The processor of claim 1 wherein the partial hardware support comprises microcode including one or more emulation microoperations to execute the deprecated instruction on the execution circuitry.

3. The processor of claim 1 wherein the first type of virtual machine exit comprises or is to be triggered by a first type of exception.

4. The processor of claim 2 wherein the hardware support comprises one or more microarchitectural components including one or more registers for storing state values and/or execution circuits for executing the emulation microoperations.

5. The processor of claim 4 wherein the second type of virtual machine exit is to specify parameters associated with the deprecated instruction, the parameters to be used to execute the emulation microoperations.

6. The processor of claim 5 wherein upon completion of the first emulation or the second emulation, the hypervisor is to provide results and return control to the first virtual machine.

7. The processor of claim 3 wherein the first type of exception comprises an invalid or undefined opcode exception.

8. The processor of claim 7 wherein the second type of virtual machine exit comprises or is to be triggered by a second type of exception, the second type of exception to specify parameters associated with the deprecated instruction.

9. A method comprising:
 executing instructions on at least one core of a plurality of cores, each having a current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture;
 performing either a first type or a second type of virtual machine exit responsive to detecting a deprecated instruction in a first virtual machine,
 performing by the hypervisor, responsive to the first type of virtual machine exit, a first emulation of the prior microarchitecture without reliance on the partial hardware support, and
 performing by the hypervisor, responsive to the first type of virtual machine exit, a second emulation of the prior microarchitecture relying on the partial hardware support.

10. The method of claim 9 wherein the partial hardware support comprises microcode including one or more emulation microoperations to execute the deprecated instruction on the execution circuitry.

11. The method of claim 9 wherein the first type of virtual machine exit comprises or is to be triggered by a first type of exception.

12. The method of claim 10 wherein the hardware support comprises one or more microarchitectural components including one or more registers for storing state values and/or execution circuits for executing the emulation microoperations.

13. The method of claim 12 wherein the second type of virtual machine exit is to specify parameters associated with the deprecated instruction, the parameters to be used to execute the emulation microoperations.

14. The method of claim 13 wherein upon completion of the first emulation or the second emulation, the hypervisor is to provide results and return control to the first virtual machine.

15. The method of claim 11 wherein the first type of exception comprises an invalid or undefined opcode exception.

16. The method of claim 15 wherein the second type of virtual machine exit comprises or is to be triggered by a second type of exception, the second type of exception to specify parameters associated with the deprecated instruction.

17. A non-transitory machine-readable medium having program code stored thereon which, when executed by a machine, causes the machine to perform the operations of:
 executing instructions on at least one core of a plurality of cores, each having a current microarchitecture including hardware support for virtual execution environment comprising a hypervisor running at a first privilege level and one or more virtual machines each running at a second privilege level, the microarchitecture further including partial hardware support for executing deprecated instructions associated with a prior microarchitecture;
 performing either a first type or a second type of virtual machine exit responsive to detecting a deprecated instruction in a first virtual machine,
 performing by the hypervisor, responsive to the first type of virtual machine exit, a first emulation of the prior microarchitecture without reliance on the partial hardware support, and performing by the hypervisor, responsive to the first type of virtual machine exit, a second emulation of the prior microarchitecture relying on the partial hardware support.

18. The non-transitory machine-readable medium of claim 17 wherein the partial hardware support comprises microcode including one or more emulation microoperations to execute the deprecated instruction on the execution circuitry.

19. The non-transitory machine-readable medium of claim 17 wherein the first type of virtual machine exit comprises or is to be triggered by a first type of exception.

20. The non-transitory machine-readable medium of claim 18 wherein the hardware support comprises one or more microarchitectural components including one or more registers for storing state values and/or execution circuits for executing the emulation microoperations.

21. The non-transitory machine-readable medium of claim 20 wherein the second type of virtual machine exit is to specify parameters associated with the deprecated instruction, the parameters to be used to execute the emulation microoperations.

22. The non-transitory machine-readable medium of claim 21 wherein upon completion of the first emulation or the second emulation, the hypervisor is to provide results and return control to the first virtual machine.

23. The non-transitory machine-readable medium of claim 19 wherein the first type of exception comprises an invalid or undefined opcode exception.

24. The non-transitory machine-readable medium of claim 23 wherein the second type of virtual machine exit comprises or is to be triggered by a second type of exception, the second type of exception to specify parameters associated with the deprecated instruction.

* * * * *